(12) United States Patent
Galitsky

(10) Patent No.: US 11,914,961 B2
(45) Date of Patent: Feb. 27, 2024

(54) RELYING ON DISCOURSE TREES TO BUILD ONTOLOGIES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 374 days.

(21) Appl. No.: 17/466,409

(22) Filed: Sep. 3, 2021

(65) Prior Publication Data

US 2022/0215174 A1 Jul. 7, 2022

Related U.S. Application Data

(60) Provisional application No. 63/134,757, filed on Jan. 7, 2021.

(51) Int. Cl.
*G06F 40/295* (2020.01)
*G06N 5/04* (2023.01)
*G06F 40/35* (2020.01)

(52) U.S. Cl.
CPC ............ *G06F 40/295* (2020.01); *G06F 40/35* (2020.01); *G06N 5/04* (2013.01)

(58) Field of Classification Search
CPC ............................... G06F 40/295; G06F 40/35
See application file for complete search history.

(56) References Cited

U.S. PATENT DOCUMENTS 7,305,336 B2 * 12/2007 Polanyi ................... G06F 40/35
707/E17.058
2016/0041986 A1 * 2/2016 Nguyen ................. G06Q 50/01
707/711

(Continued)

FOREIGN PATENT DOCUMENTS

WO 0210980 2/2002

OTHER PUBLICATIONS

MedlinePlus, Aripiprazole, Available Online at: https://medlineplus.gov/druginfo/meds/a603012.html, 2019, pp. 1-8.

(Continued)

*Primary Examiner* — Ibrahim Siddo
(74) *Attorney, Agent, or Firm* — Kilpatrick Townsend & Stockton LLP

(57) ABSTRACT

Systems, devices, and methods of the present invention involve discourse trees. In an example, a method involves generating a discourse tree. The method includes identifying, from the discourse tree, a central entity that is associated with a rhetorical relation of type elaboration and corresponds to a topic node that identifies a central entity of the text. The method includes determining a subset of elementary discourse units of the discourse tree that are associated with the central entity. The method includes forming generalized phrases from the subset of elementary discourse units. The method includes forming tuples from the generalized phrases, where a tuple is an ordered set of words in normal form. The method involves responsive to successfully converting an elementary discourse unit associated with an identified tuple into a logical representation, updating the ontology with an entity from the identified tuple.

20 Claims, 32 Drawing Sheets

(56) References Cited

U.S. PATENT DOCUMENTS

2017/0221128 A1 8/2017 Galitsky et al.
2020/0286463 A1 9/2020 Galitsky

OTHER PUBLICATIONS

Abacha et al., Medical Ontology Validation through Question Answering, Conference on Artificial Intelligence in Medicine, May 2013.
Agichtein et al., Snowball: Extracting Relations from Large Plain-Text Collections, In: Proceedings of the Fifth ACM Conference on Digital Libraries, Jun. 2000, pp. 85-94.
Amith et al., Lightweight Predicate Extraction for Patient-Level Cancer Information and Ontology Development, BMC Medical Informatics and Decision Making, vol. 17, No. 73, Jul. 2017, 13 pages.
Banko et al., Open information extraction for the web, Proceedings of the International Joint Conferences on Artificial Intelligence, Jan. 2007, pp. 2670-2676.
Barzilay et al., Modeling Local Coherence: An Entity-Based Approach, Computational Linguistics, vol. 34, No. 1, Mar. 2008, pp. 1-34.
Bhattacharyya, Introduction to SNOMED CT, Springer, Indian Medical Association, 2016, 27 pages.
Bojanowski et al., Enriching Word Vectors with Subword Information, Transactions of the Association for Computational Linguistics, Jun. 2017, 12 pages.
Clevert et al., Fast and Accurate Deep Network Learning by Exponential Linear Units, Available Online at: https://arxiv.org/abs/1511.07289, Feb. 2016, pp. 1-14.
Del Corro et al., ClausIE: Clause-Based Open Information Extraction, International World Wide Web Conference Committee, May 13-17, 2013, pp. 355-365.
Demelo et al., Ontology-Driven Search and Triage: Design of a Web-Based Visual Interface for Medline, Jmir Medical Informatics, vol. 5, Feb. 2017.
Doms et al., Gopubmed: Exploring Pubmed With the Gene Ontology, Nucleic Acids Research, vol. 33, Jul. 2005, pp. W783-W786.
El-Sappagh et al., SNOMED CT Standard Ontology Based on the Ontology for General Medical Science, BMC Medical Informatics and Decision Making, vol. 18, No. 76, Aug. 2018, pp. 1-19.
Galitsky et al., Assessing Plausibility of Explanation and Meta-Explanation in Inter-Human Conflicts, Engineering Applications of Artificial Intelligence, vol. 24, No. 8, Dec. 2011, pp. 1472-1486.
Galitsky, Building Chatbot Thesaurus, Developing Enterprise Chatbots, Apr. 2019, pp. 221-252.
Galitsky et al., From Generalization of Syntactic Parse Trees to Conceptual Graphs, 18th International Conference on Conceptual Structures, vol. 6208, Jul. 2010, pp. 185-190.
Galitsky, Generalization of Parse Trees for Iterative Taxonomy Learning, Information Sciences, vol. 329, Sep. 21, 2015, 43 pages.
Galitsky et al., Improving Web Search Relevance with Learning Structure of Domain Concepts, Clusters, Orders, and Trees: Methods and Applications, May 2014, 37 pages.
Galitsky et al., Inferring Semantic Properties of Sentences Mining Syntactic Parse Trees, Data & Knowledge Engineering, vol. 81, Nov. 2012, pp. 21-45.
Galitsky, Machine Learning of Syntactic Parse Trees for Search and Classification of Text, Engineering Application of AI, vol. 26, Issue 3, Mar. 2013, pp. 1072-1091.
Galitsky et al., Mining the Blogosphere for Contributor's Sentiments, American Association for Artificial Intelligence, Jan. 2006, 3 pages.
Galitsky et al., Using Generalization of Syntactic Parse Trees for Taxonomy Capture on the Web, Proceedings of the 19th International Conference on Conceptual Structures for Discovering Knowledge, vol. 6828, Jul. 2011, pp. 104-117.
Gonzalez et al., Recent Advances and Emerging Applications in Text and Data Mining for Biomedical Discovery, Briefings in Bioinformatics, vol. 17, No. 1, Sep. 2015, pp. 33-42.
Grosz et al., Centering: A framework for Modeling the Local Coherence of Discourse, Computational Linguistics, vol. 21, No. 2, Jan. 1995, pp. 203-225.
Gupta et al., A Survey of Text Mining Techniques and Applications, Journal of Emerging Technologies in Web Intelligence, vol. 1, No. 1, Aug. 2009, pp. 60-76.
Hearst et al., Finding the Flow in Web Site Search, Communications of the ACM, vol. 45, No. 9, Sep. 2002, pp. 42-49.
Hoeber, Visual Search Analytics: Combining Machine Learning and Interactive Visualization to Support Human-Centered Search, Proceedings of the MindTheGap'14 Workshop, Mar. 4, 2014, 7 pages.
Jin et al., PubMedQA: A Dataset for Biomedical Research Question Answering, Available Online at: https://arxiv.org/pdf/1909.06146.pdf, Sep. 13, 2019, 11 pages.
Johnson, Data Descriptor: MIMIC-III, A Freely Accessible Critical Care Database, Scientific Data, May 24, 2016, 9 pages.
Jusoh et al., The Use of Ontology in Clinical Information Extraction, Journal of Physics: Conference Series, Oct. 2019, pp. 1-9.
Kim et al., Corpus Annotation for Mining Biomedical Events from Literature, BMC Bioinformatics, Jan. 8, 2008, pp. 1-25.
Kim et al., Genia Corpus-A Semantically Annotated Corpus for Bio-Textmining, Bioinformatics, vol. 19, No. 3, Jul. 3, 2003, pp. 180-182.
Luque et al., An Advanced Review on Text Mining in Medicine, Wires Data Mining and Knowledge Discovery, vol. 19, No. 3, Dec. 2018.
Nie et al., Bridging the Vocabulary Gap Between Health Seekers and Healthcare Knowledge, IEEE Transactions on Knowledge and Data Engineering, vol. 27, No. 2, Feb. 2015, pp. 396-409.
Otmani et al., Ontology-Based Approach to Enhance Medical Web Information Extraction, International Journal of Web Information Systems, vol. 15, No. 3, Aug. 2019, pp. 359-382.
Racunas et al., Hybrow: A Prototype System for Computer-Aided Hypothesis Evaluation, Bioinformatics, Sep. 2004, 9 pages.
Rajendran et al., MOSS-IR: Multi-Ontology Based Search System for Information Retrieval in E-Health Domain, Procedia Computer Science, vol. 47, 2015, pp. 179-187.
Richardson et al., MCTest: A Challenge Dataset for the Open-Domain Machine Comprehension of Text, Proceedings of the 2013 Conference on Empirical Methods in Natural Language Processing, Oct. 18-21, 2013, pp. 193-203.
Roberts et al., Annotating Logical Forms for EHR Questions, International Conference on Language Resources and Evaluation, May 2016, pp. 1-14.
Rubin et al., BioPortal: A Web Portal to Biomedical Ontologies, AAAI Spring Symposium: Symbiotic Relationships between Semantic Web and Knowledge Engineering, Jan. 2007, 4 pages.
Schmitz et al., Open Language Learning for Information Extraction, Proceedings of the 2012 Joint Conference on Empirical Methods in Natural Language Processing and Computational Natural Language Learning, Jul. 12-14, 2012, pp. 523-534.
Silla et al., A Survey of Hierarchical Classification Across Different Application Domains, Data Mining Knowledge Discovery, Jan. 2011, pp. 31-72.
Speer et al., ConceptNet 5.5: An Open Multilingual Graph of General Knowledge, Proceedings of the Thirty-First AAAI Conference on Artificial Intelligence, Feb. 2017, pp. 4444-44451.
Tsatsaronis et al., An Overview of the BioASQ Large-Scale Biomedical Semantic Indexing and Question Answering Competition, BMC bioinformatics, vol. 16, No. 138, Apr. 2015, pp. 1-28.
Galitsky, Discovering Rhetorical Agreement Between a Request and Response, Dialogue & Discourse, vol. 8, No. 2, Dec. 21, 2017, pp. 167-205.
International Application No. PCT/US2022/011280, International Search Report and Written Opinion dated Apr. 13, 2022, 13 pages.
Arbabi et al., Identifying Clinical Terms in Medical Text Using Ontology-Guided Machine Learning, JMIR Medical Informatics, vol. 7, No. 2, May 10, 2019.
Berant et al., Modeling Biological Processes for Reading Comprehension, Proceedings of the 2014 Conference on Empirical Methods in Natural Language Processing, Oct. 2014, 12 pages.

(56) References Cited

OTHER PUBLICATIONS

Galitsky, Improving Relevance in a Content Pipeline via Syntactic Generalization, Engineering Applications of Artificial Intelligence, vol. 58, Feb. 2017, pp. 1-26.
Galitsky, Natural Language Question Answering System: Technique of Semantic Headers, Advanced Knowledge International, 2003.
Hoeber et al., Evaluating Citation Visualization and Exploration Methods for Supporting Academic Search Tasks, Online Information Review, vol. 39, No. 2, Apr. 2013, pp. 229-254.
Hammar, Content Ontology Design Patterns: Qualities, Methods, and Tools, Department of Computer and Information Science, 2017.
Wu et al., A Study of Ontology-Based Query Expansion, Technical Report, 2011, 38 Pages.

\* cited by examiner

RELYING ON DISCOURSE TREES TO BUILD ONTOLOGIES

CROSS-REFERENCES TO RELATED APPLICATIONS

This application claims the benefit of U.S. Provisional Application No. 63/134,757 filed Jan. 7, 2021, the contents of which is hereby incorporated by reference in its entirety for all purposes.

TECHNICAL FIELD

This disclosure is generally concerned with linguistics. More specifically, this disclosure relates to using discourse techniques to form ontologies.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. But such applications are unable to leverage rich discourse related information to form ontologies, thereby resulting in inferior answer questions, perform dialog management, or provide recommendations systems.

BRIEF SUMMARY

Generally, systems, devices, and methods of the present invention are related to generating or extending ontologies using discourse techniques. In an example, a computer-implemented method determines text in a discourse tree that is associated with a central entity. The method generalizes the text In an aspect, a method of extending an ontology includes generating, from text including fragments, a discourse tree that represents rhetorical relationships between the fragments. The discourse tree includes nodes, each nonterminal node representing a rhetorical relationship between two of the fragments, and each terminal node of the nodes of the discourse tree being associated with one of the fragments. The method further includes identifying, from the discourse tree, a central entity that is associated with a rhetorical relation that is not of type elaboration or type joint and corresponds to a topic node that identifies a central entity of the text. The method further includes determining, from the discourse tree, a subset of elementary discourse units that are associated with the central entity. Determining the subset of elementary discourse units includes identifying nucleus elementary discourse units that are associated with a relation of type elaboration. The method further includes forming generalized phrases by identifying, in text associated with the subset of elementary discourse units, one or more elements common to two or more of the elementary discourse units in the subset of elementary discourse units. The method further includes forming tuples from the generalized phrases by applying one or more syntactic or semantic templates to the one or more common elements. Each tuple is an ordered set of words in normal form. The method further includes identifying each tuple of tuples as having a type including: a noun phrase, a verb phrase, an adjective phrase, or a prepositional phrase. The method further includes, in response to successfully converting an elementary discourse unit associated with an identified tuple into a logical representation including a predicate and an argument, updating the ontology with an entity from the identified tuple. The conversion is based on the type of the identified tuple.

In an aspect, the method further includes in response to receiving a query from a user device, locating the entity in the ontology and providing the entity to the user device.

In an aspect, the method further includes identifying an entity class. Identifying the entity class involves encoding tuple as a vector representation, providing the vector representation to a machine learning model and receiving, from the machine learning model, the entity class.

In an aspect, providing the entity to the user device includes providing the entity class to the user device.

In an aspect, identifying the central entity includes locating a root node in the discourse tree. Identifying the central entity includes determining, from the discourse tree, a subset of terminal nodes that are associated with a nonterminal node representing a rhetorical relationship of type elaboration and represent a nucleus elementary discourse unit. Identifying the central entity includes calculating, for each node of the subset of terminal nodes, a respective path length from the root node. Identifying the central entity includes identifying, from the subset of terminal nodes, a topic node having a path length that is a smallest path length of the path lengths.

In an aspect, converting each elementary discourse unit associated with one or more of the tuples into a respective logical representation includes identifying that a type of a tuple is a noun phrase or a prepositional phrase, extracting one or more of a head noun or a last noun as a logical predicate, and extracting one or more other words as arguments of the logical predicate.

In an aspect, converting each elementary discourse unit associated with one or more of the tuples into a respective logical representation includes identifying that a type of a tuple is verb phrase and extracting a verb of the tuple as the predicate and one or more other words as arguments.

In an aspect, each tuple includes a predicate, a subject, and an object.

In an aspect, the method further includes identifying an entity class of one or more of the tuples corresponding to the generalized phrases. An entity class represents a category of the entity. The updating further includes updating the ontology with the entity class.

In an aspect, a system includes a non-transitory computer-readable medium storing computer-executable program instructions and a processing device communicatively coupled to the non-transitory computer-readable medium for executing the computer-executable program instructions. Executing the computer-executable program instructions configures the processing device to perform operations. The operations include generating, from text including fragments, a discourse tree that represents rhetorical relationships between the fragments. The discourse tree includes nodes, each nonterminal node representing a rhetorical relationship between two of the fragments, and each terminal node of the nodes of the discourse tree being associated with one of the fragments. The operations include identifying, from the discourse tree, a central entity that (i) is associated with a rhetorical relation of type elaboration or type joint and (ii) corresponds to a topic node that identifies a central entity of the text. The operations include constructing, from the discourse tree, a communicative discourse tree by matching each fragment that has a verb in the discourse tree with a predetermined verb signature. The operations include identifying, from the communicative discourse tree, a central entity that is associated with a rhetorical relation of type elaboration and corresponds to a topic node that identifies a central entity of the text. The operations include determining, from the communicative discourse tree, a subset of elementary discourse units that are associated with the central entity. Determining the subset of elementary discourse units includes identifying nucleus elementary discourse units that are associated with a relation of type elaboration. The operations further include forming generalized phrases by identifying, in text associated with the subset of elementary discourse units, one or more elements common to two or more of the elementary discourse units in the subset of elementary discourse units. The operations further include forming tuples from the one or more common elements by applying one or more syntactic or semantic templates to the respective phrase. Each tuple is an ordered set of words in normal form. The operations further include identifying each tuple of tuples as having a type including: a noun phrase, a verb phrase, an adjective phrase, or a prepositional phrase. The operations further include, in response to successfully converting an elementary discourse unit associated with an identified tuple into a logical representation including a predicate and an argument, updating the ontology with an entity from the identified tuple. The conversion is based on the type of the identified tuple.

The above methods can be implemented as tangible computer-readable media and/or operating within a computer processor and attached memory.

BRIEF DESCRIPTION OF THE DRAWINGS

FIG. 24, which includes

DETAILED DESCRIPTION

Figure 1:
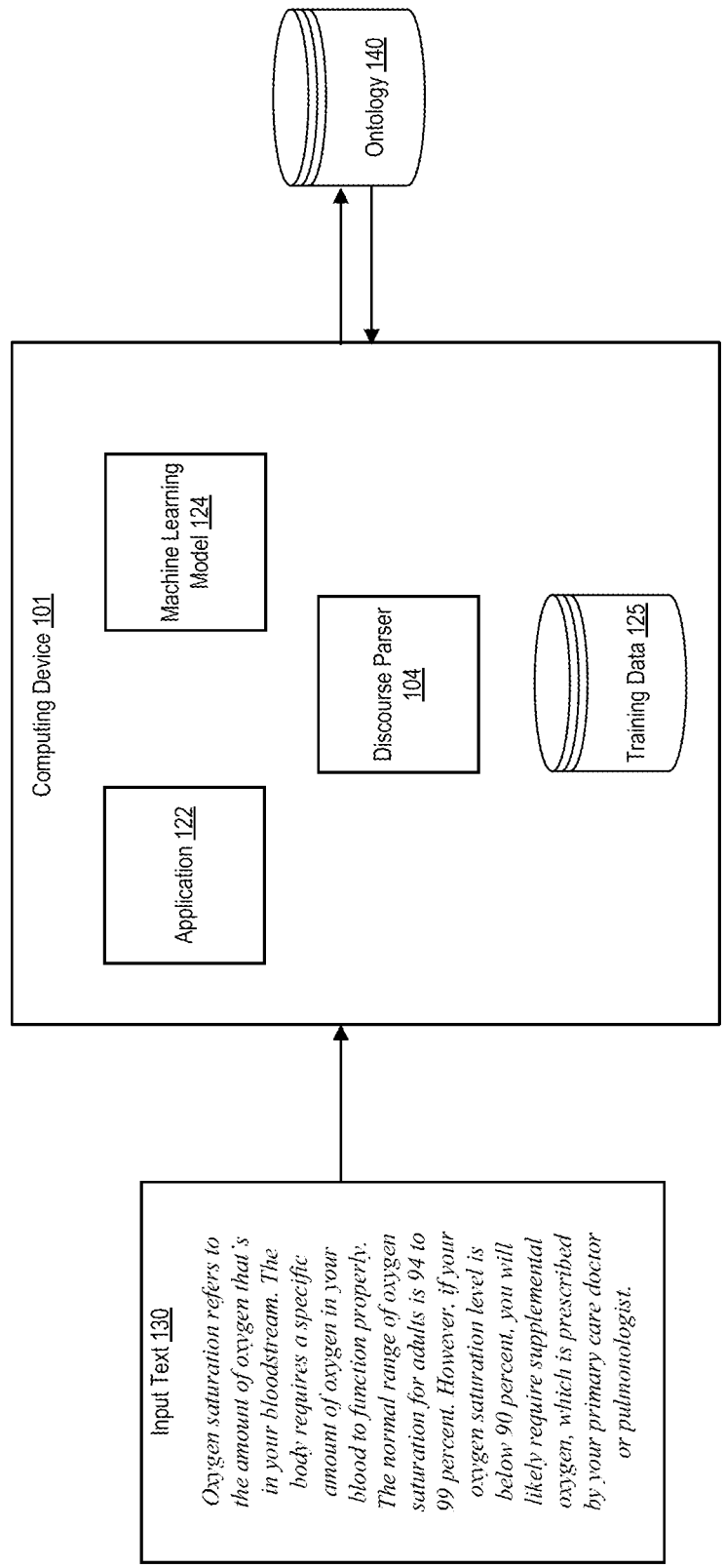
FIG. 1 depicts an exemplary ontology environment in accordance with an aspect.

Aspects disclosed herein provide technical improvements to the area of computer-implemented linguistics. More specifically, certain aspects use discourse and other techniques to generate improved ontologies. An ontology includes entities and relations between pairs of related entities or attributes. Ontologies can be constructed for any knowledge domain, such as legal, technical, medical, and so forth. In turn, ontologies can be used for electronic systems such as Decision Support Systems (DSS) or search tools.

As an example, in the medical domain, an ontology may map a disease to a drug name to a treatment. The use of ontologies in medicine is mainly focused on the representation of medical terminologies. For instance, health professionals use ontologies to represent knowledge about symptoms and treatments of diseases. Pharmaceutical enterprises use ontologies to represent information about drugs, dosages, and allergies.

Ontologies are a foundation for numerous DSSs used to support medical activities therefore the quality of the underlying ontologies affects the results of using DSSs that rely on these ontologies. As a consequence, automatically-built medical ontologies (including schema knowledge and individuals description) are validated by domain experts. For that reason, traditionally, building and adapting medical ontologies has relied upon close collaboration between domain experts (e.g. health professionals) and knowledge engineers. Existing automated ontology construction techniques exist but are limited to creating partial solutions.

Technical advantages of some aspects therefore include improved ontologies, enabled via the use of discourse techniques, which more accurately represent a source text. Using discourse techniques facilitates a selection of more relevant ontology entries from a source text as compared to previous techniques. Examples of applications that benefit from improved ontologies include search systems, recommendation systems, DSSs, autonomous agents, and diagnosis systems.

Additionally, some aspects use Communicative Discourse Trees (CDTs). CDTs are discourse trees that include communicative actions. By incorporating labels that identify communicative actions, learning of communicative discourse trees can occur over a richer features set than simply rhetoric relations and syntax of elementary discourse units (EDUs). With such a feature set, additional techniques can be used to develop and/or argument ontologies, thereby enabling improved automated agents. In so doing, computing systems enable autonomous agents that are capable of intelligently answering questions.

CERTAIN DEFINITIONS

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

As used herein, "claim" is an assertion of truth of something. For example, a claim could be "I am not responsible for paying rent this month" or "the rent is late."

As used herein, an "argument" is a reason or set of reasons set forth to support a claim. An example argument for the above claim is "the necessary repairs were not completed."

As used herein, a "argument validity" or "validity" refers to whether an argument that supports a claim is internally and consistent. Internal consistency refers to whether the argument is consistent with itself, e.g., does not contain two contradictory statements. External consistency refers to whether an argument is consistent with known facts and rules.

As used herein, a "logic system" or "logic program" is a set of instructions, rules, facts, and other information that can represent argumentation of a particular claim. Solving the logic system results in a determination of whether the argumentation is valid.

FIG. 1 depicts an exemplary ontology environment in accordance with an aspect. FIG. 1 depicts computing device 101, input text 120, and ontology 140. Examples of computing devices include client computing devices 2902, 2904, 2906, and 2908 and client computing devices 3004, 3006, 3008 depicted in FIGS. 29 and 30 respectively. In the example depicted, computing device 101 accesses input text 120 and uses discourse and other techniques to form and/or update ontology 140. An example of a process for creating entries for an ontology is process 2800, discussed with respect to FIG. 28. An ontology includes data or information about a specific subject area such as law, engineering, or medicine. An ontology typically includes multiple entries, each of which can include logical statements and cross-references to other entries or external sources.

Computing device 101 includes one or more of application 122, discourse parser 104, machine learning model 124, and training data 125. Application 122 can be configured to perform operations described herein, such as parsing text, applying semantic or syntactic templates to text, and so forth. Discourse parser 104 can create discourse trees and/or communicative discourse trees. An example of a process for creating forming discourse trees is process 1600, discussed with respect to FIG. 16. Machine learning model 124 can be a classifier, predictive model, or other type of model. Examples of suitable models include tree kernel models and nearest neighbor models. Machine learning model 124 can be trained using supervised or unsupervised techniques. Training data 125 can be used to train machine learning model 124. Training data can include positive and negative data sets with associated training labels.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

TABLE 1

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |

TABLE 1-continued

| Relation Name | Nucleus | Satellite |
| --- | --- | --- |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

TABLE 2

| Relation | Span | Other Span |
| --- | --- | --- |
| Contrast | One alternate | The other alternate |
| Joint | (unconstrained) | (unconstrained) |
| List | An item | A next item |
| Sequence | An item | A next item |

Figure 2:
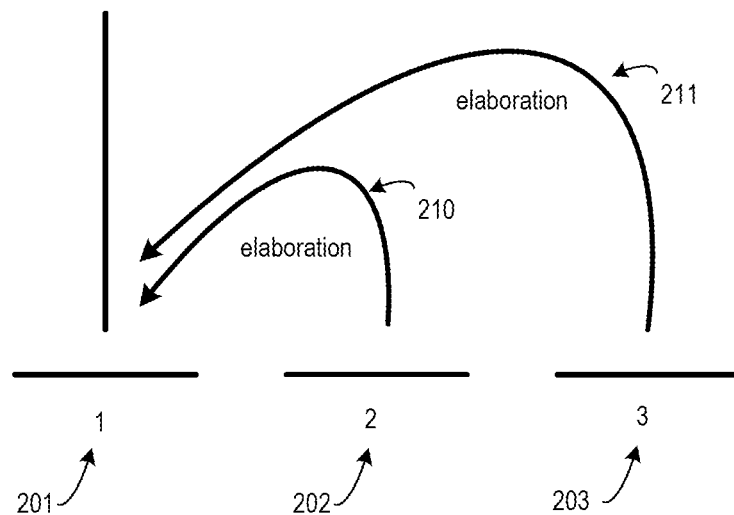
FIG. 2 depicts an example of a discourse tree in accordance with an aspect.
Figure 3:
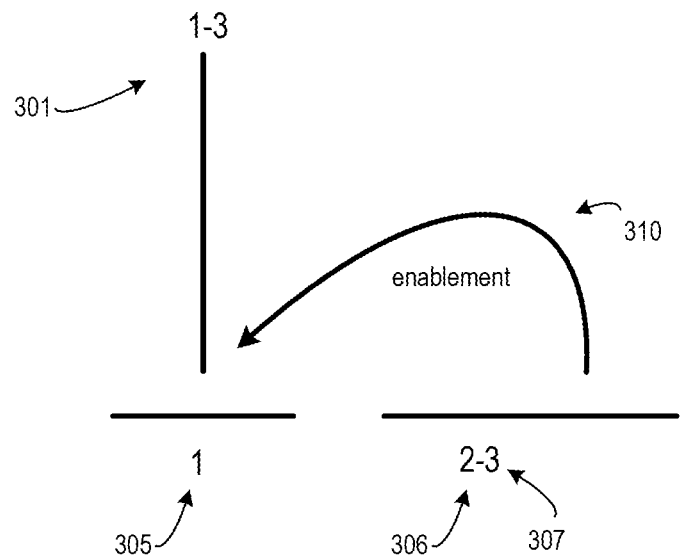
FIG. 3 depicts a further example of a discourse tree in accordance with an aspect.
Figure 3:
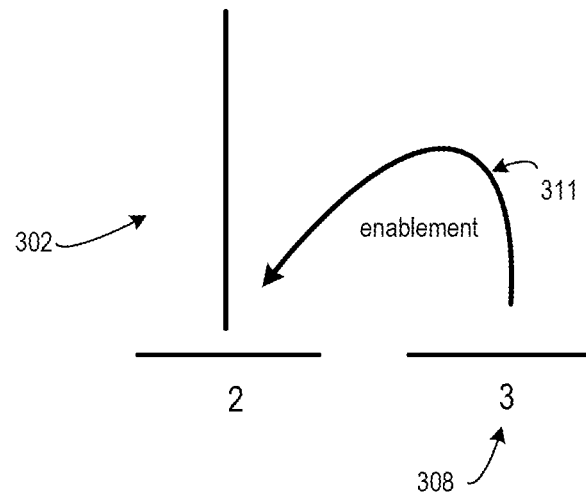

FIG. 2 depicts an example of a discourse tree in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hawaii will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 228 depicts the relationship, elaboration, between text spans 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship enablement between components 306 and 305, and 307, and 305. FIG. 3 refers to the following text spans:
1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:
(1) Divide the discourse text into units by:
 (a) Unit size may vary, depending on the goals of the analysis
 (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
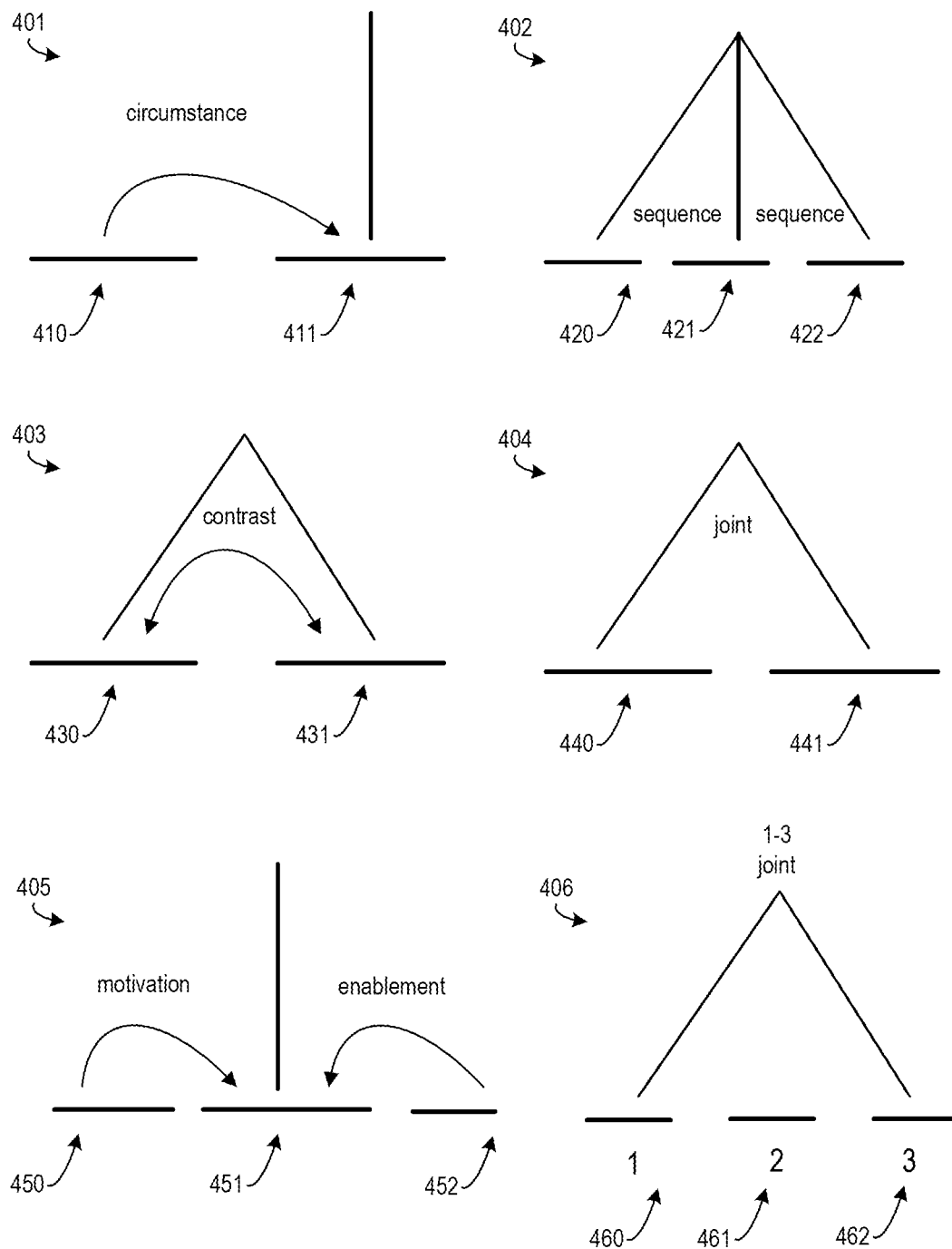
FIG. 4 depicts illustrative schemas in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:
1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
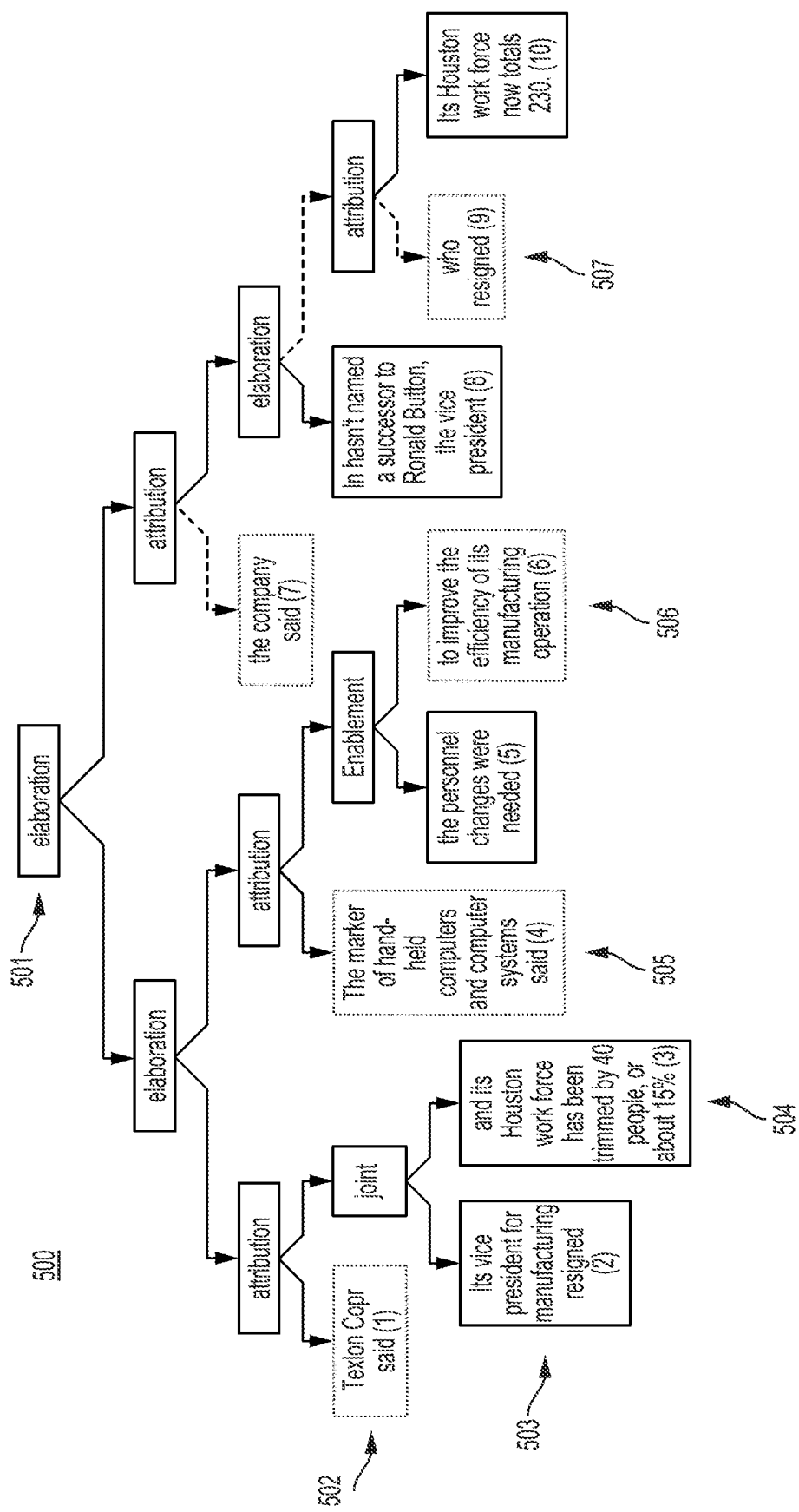
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
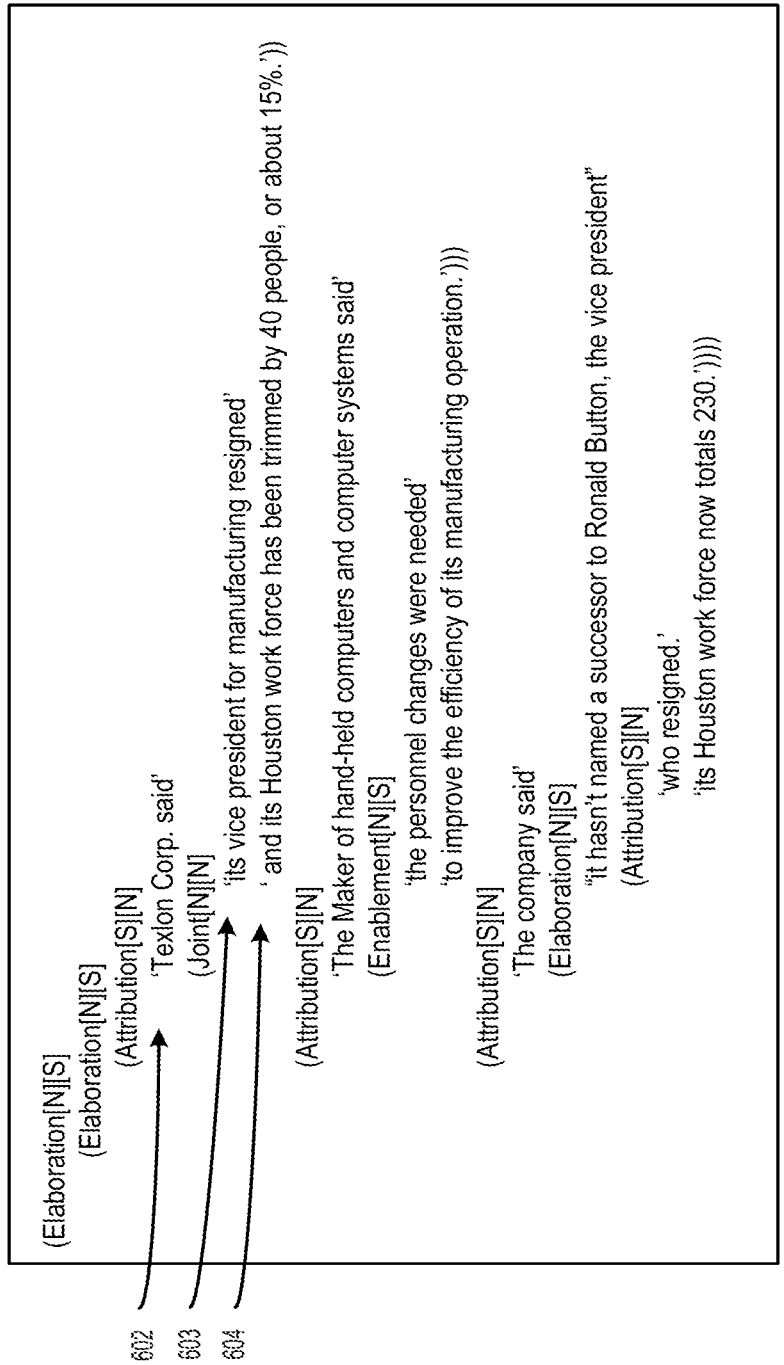
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2×((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
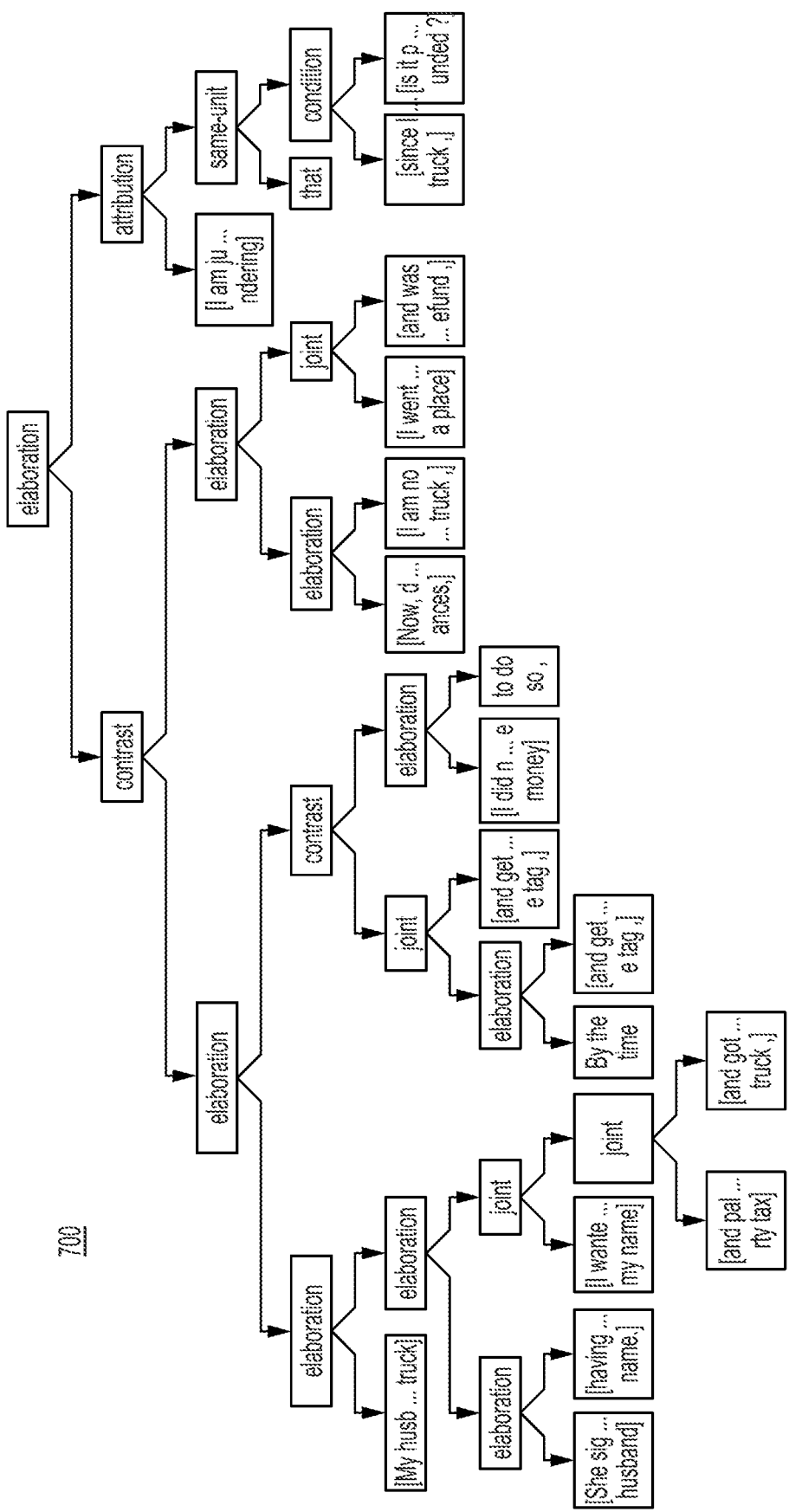
FIG. 7 depicts an exemplary discourse tree for an example request about property tax in accordance with an aspect.

FIG. 7 depicts an exemplary discourse tree for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
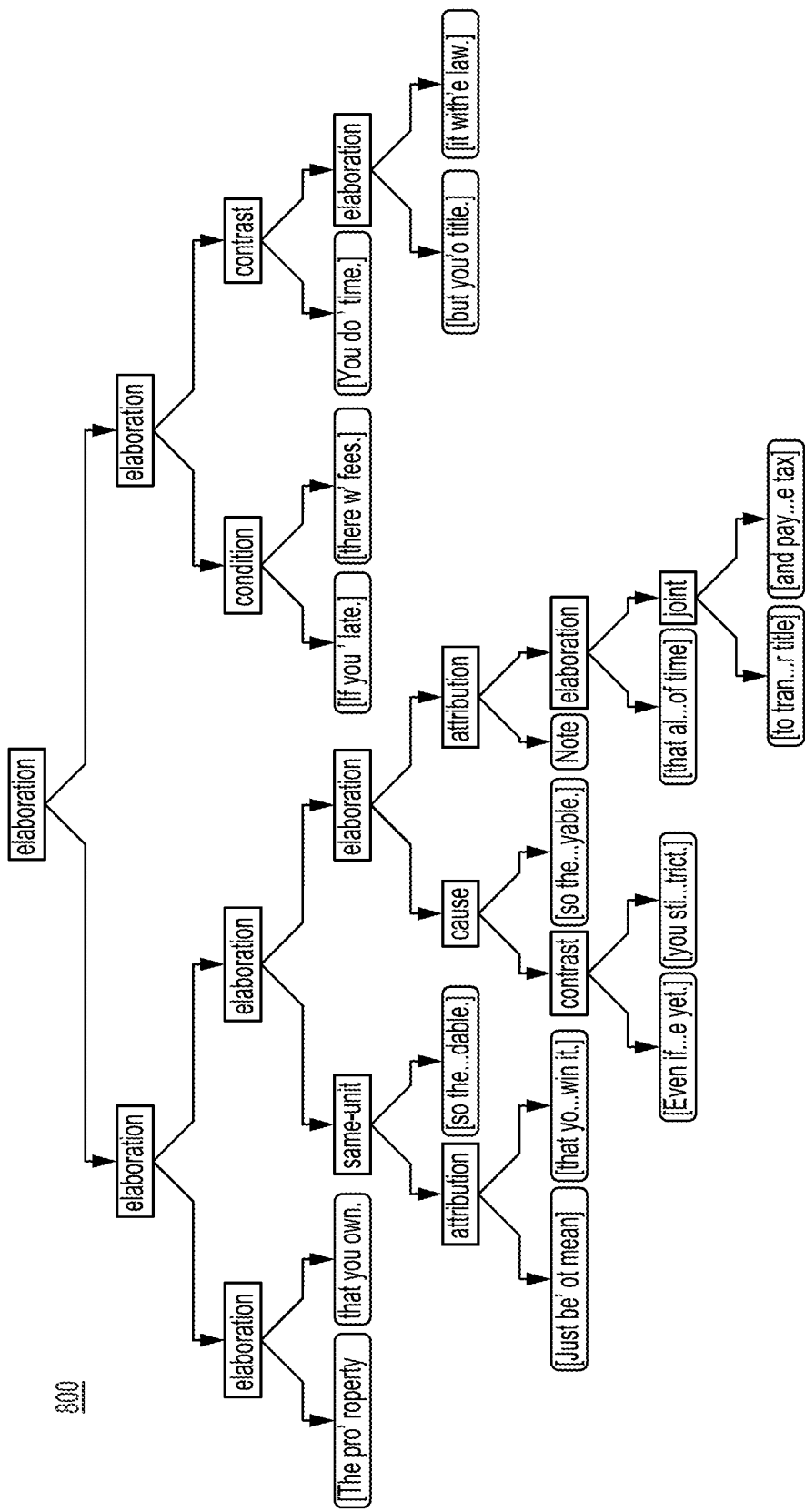
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
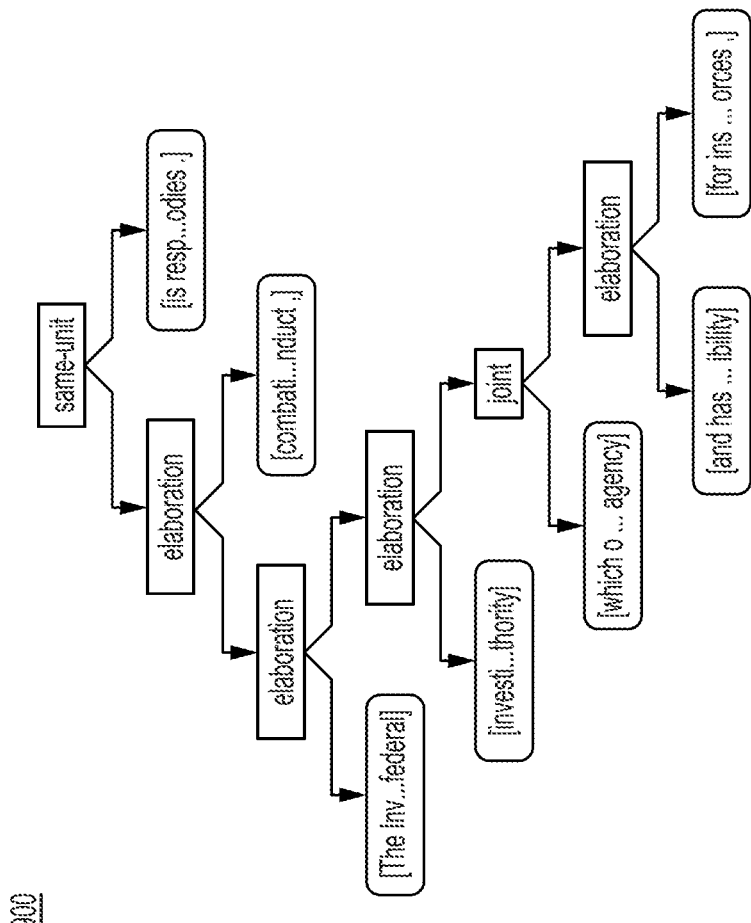
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
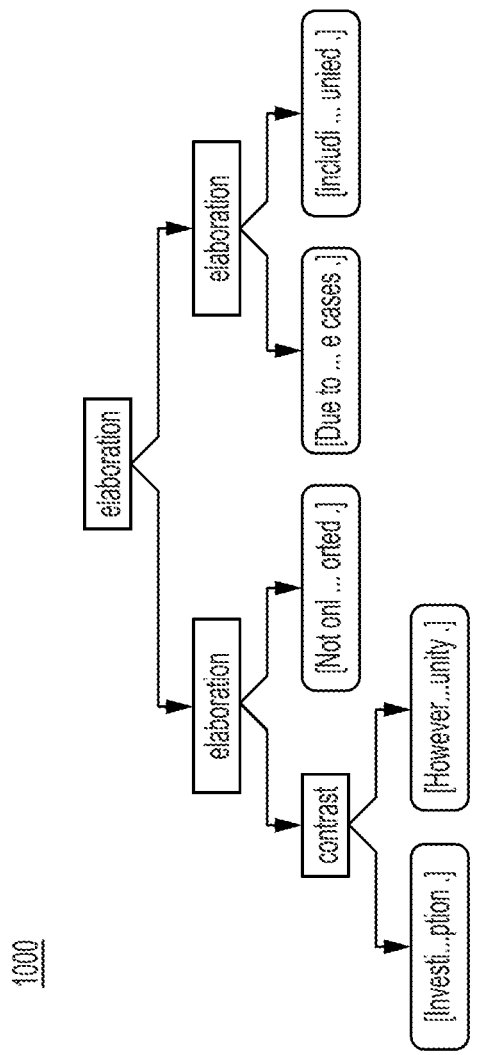
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers, see FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Application 122 can determine whether a given answer or response, such as an answer obtained from answer database 105 or a public database, is responsive to a given question, or request. More specifically, application 122 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Application 122 can determine similarity between question-answer pairs using different methods. For example, application 122 can determine level of similarity between an individual question and an individual answer. Alternatively, application 122 can determine a measure of similarity between a first pair including a question and an answer, and a second pair including a question and answer.

For example, application 122 uses Machine learning model 124 trained to predict matching or non-matching answers. Application 122 can process two pairs at a time, for example <q1, a1> and <q2, a2>. Application 122 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, application 122 uses training data 125 to train the machine learning model 124. In this manner, machine learning model 124 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, application 122 provides a training pair to machine learning model 124 and receives, from the model, a level of complementarity. Application 122 calculates a loss function by determining a difference between the determined level of complementarity and an expected level of complementarity for the particular training pair. Based on the loss function, application 122 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Application 122 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
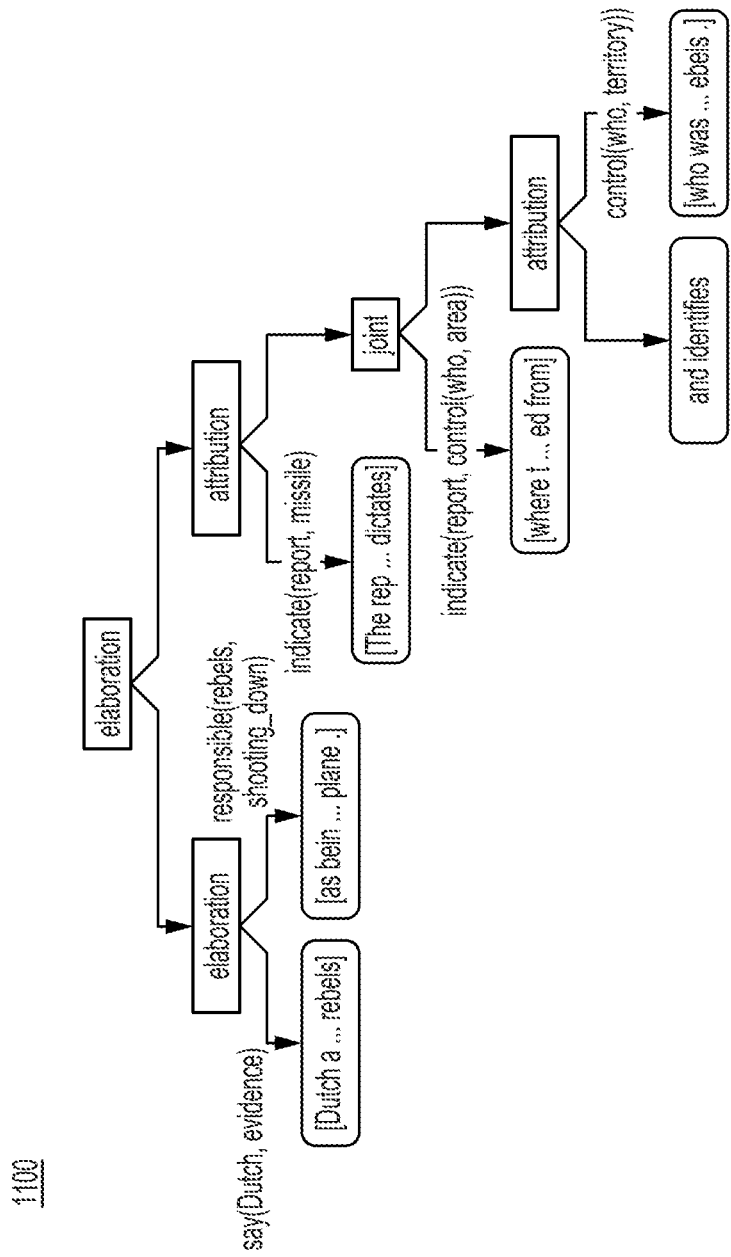
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

Figure 12:
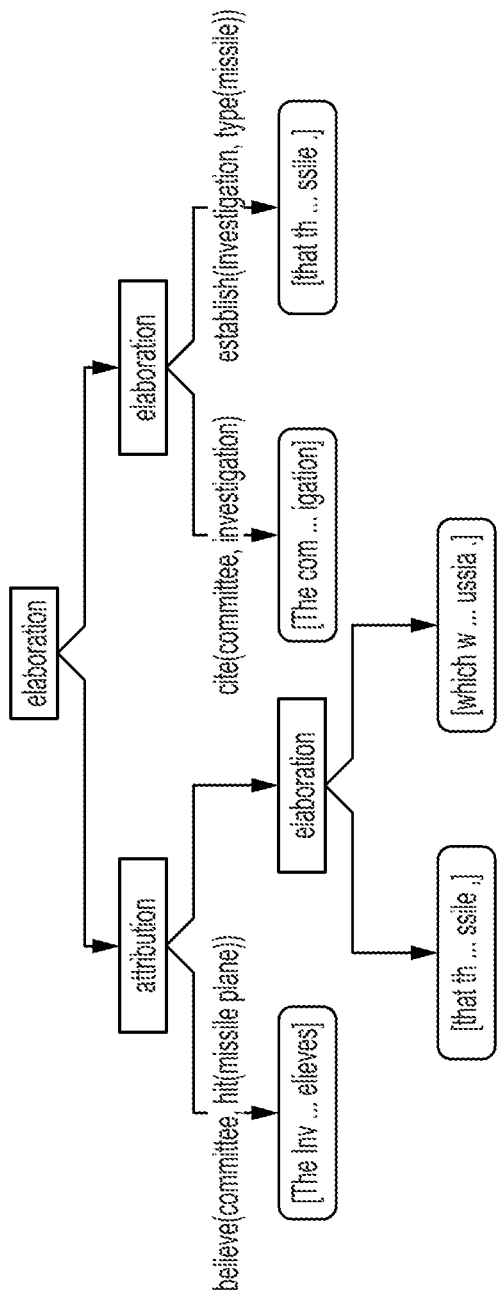
FIG. 12 illustrates a communicative discourse tree for a claim of a second agent in accordance with an aspect.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colorado FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
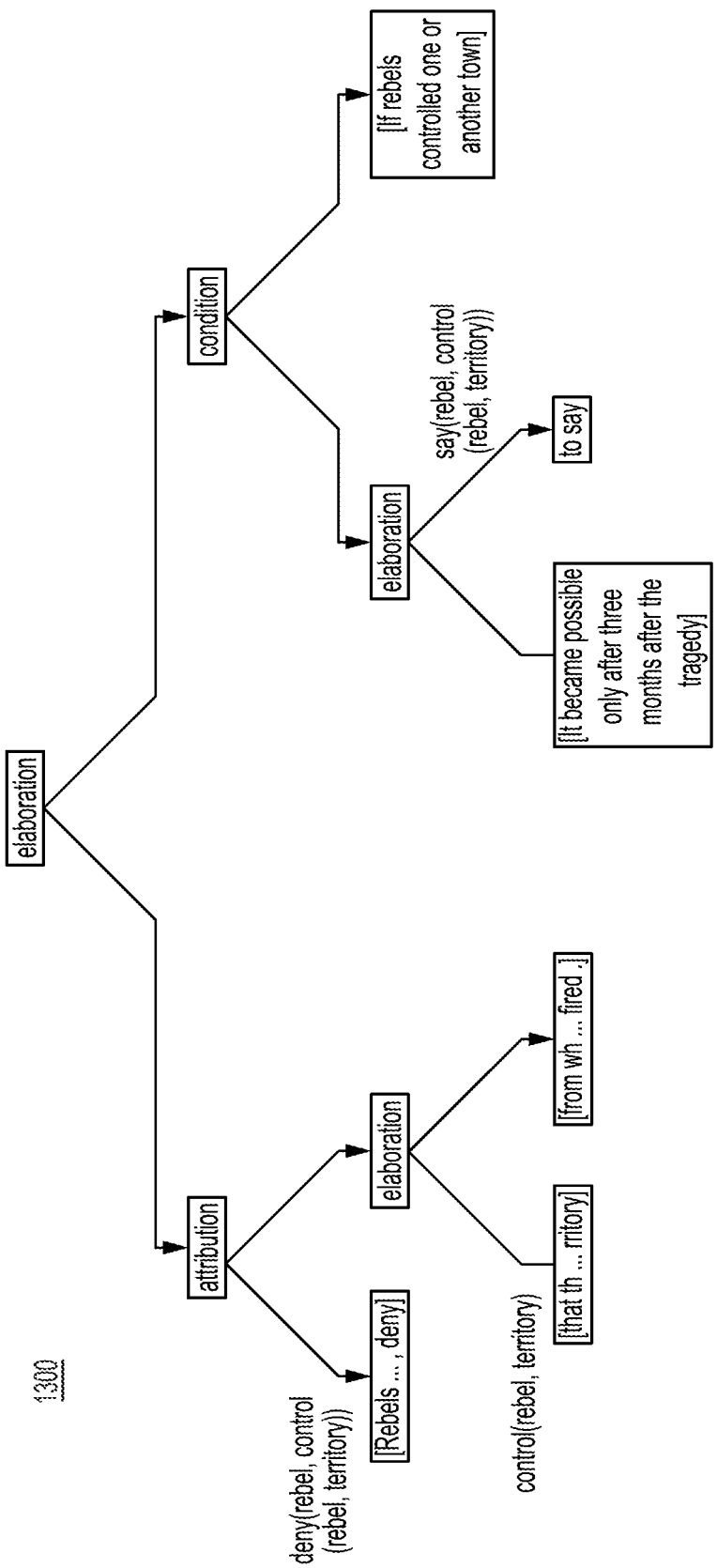
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):, property(Experiencer, Prop), adv(Prop).

NP V NP-PRO-ARB. Example "The teacher amused." Syntax Stimulus V. amuse(Stimulus, E, Emotion, Experiencer):. cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer):. cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer).
Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner (speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 2015. Topical similarity between question and answer can expressed as common sub-graphs of parse thickets. The higher the number of common graph nodes, the higher the similarity.

Figure 14:
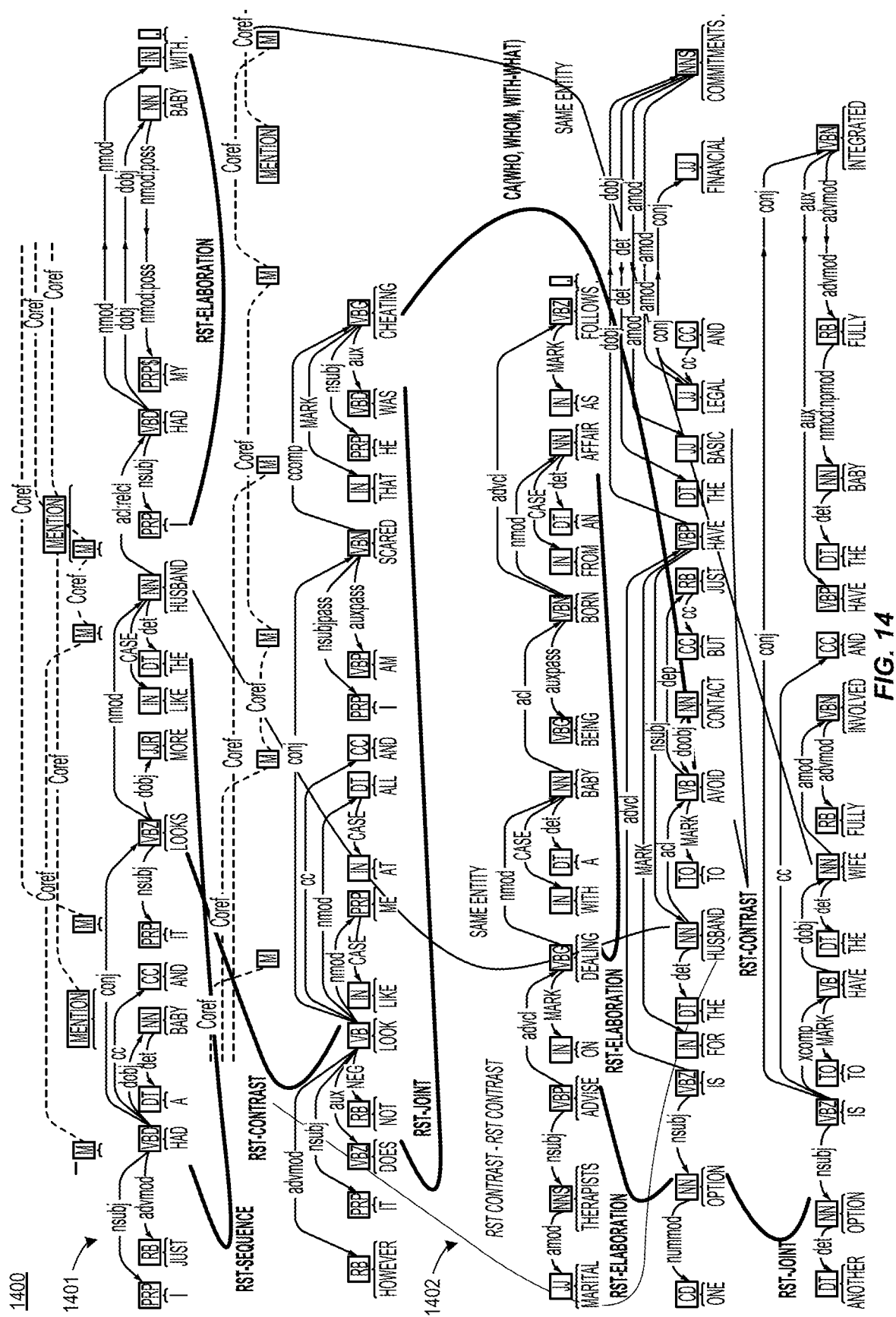
FIG. 14 illustrates parse thickets in accordance with an aspect.

FIG. 14 illustrates parse thickets in accordance with an aspect. FIG. 14 depicts parse thicket 1400 including a parse tree 1401 (for a request), and a parse tree 1402 (for a corresponding response).

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb (Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb (Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={$action_1$, $action_2$ . . . $action_n$} is a finite set of vertices corresponding to communicative actions, and A is a finite set of labeled arcs (ordered pairs of vertices), classified as follows:

Each arc $action_i$, $action_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j=s_i$ or different subjects. Each arc $action_i$, $action_j \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\hat{\ }rst2(N2,S2,W2,R2)=(rst1\hat{\ }rst2)$$
$$(N1\hat{\ }N2,S1\hat{\ }S2,W1\hat{\ }W2,R1\hat{\ }R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1)^sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst-background^rst-enablement=(S increases the ability of R to comprehend an element in N)^(R comprehending S increases the ability of R to perform the action in N)=increase-VB the -DT ability -NN of —IN R-NN to —IN.

Because the relations rst-background^rst-enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
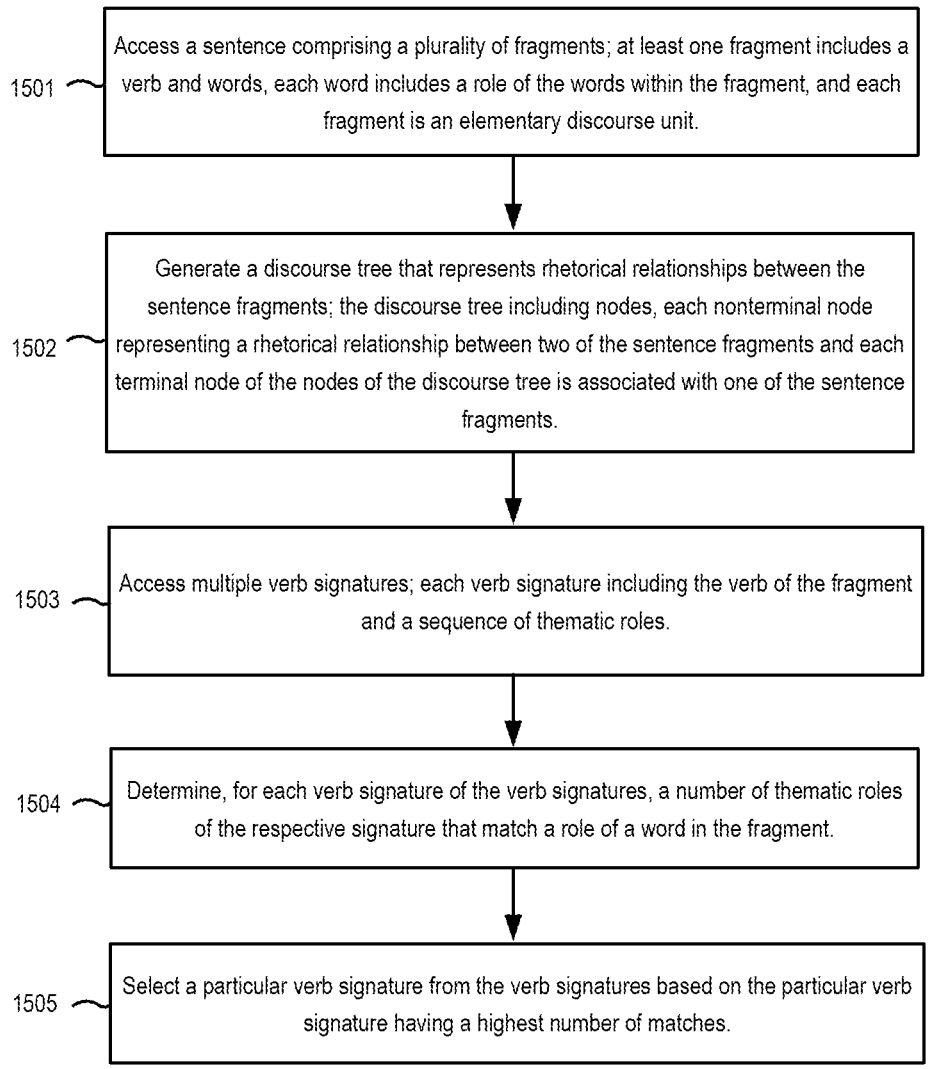
FIG. 15 illustrates an exemplary process for building a communicative discourse tree in accordance with an aspect.

FIG. 15 illustrates an exemplary process for building a communicative discourse tree in accordance with an aspect. Application 122 can implement process 1500. As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, application 122 accesses a sentence such as "Rebels, the self-proclaimed Donetsk People's Republic, deny that they controlled the territory from which the missile was allegedly fired" as described with respect to FIG. 13.

Continuing the example, application 122 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, application 122 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, application 122 accesses a list of verbs, e.g., from VerbNet. Each verb matches or is related to the verb of the fragment. For example, the for the first fragment, the verb is "deny." Accordingly, application 122 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," application 122 accesses a list of frames, or verb signatures for verbs that match "deny." The list is "NP V NP," "NP V NP to be NP," "NP V that S" and "NP V NP."

Each verb signature includes thematic roles. A thematic role refers to the role of the verb in the sentence fragment. Application 122 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, application 122 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Representing a Request-Response

Request-response pairs can be analyzed alone or as pairs. In an example, request-response pairs can be chained together. In a chain, rhetoric agreement is expected to hold not only between consecutive members but also triples and four-tuples. A discourse tree can be constructed for a text expressing a sequence of request-response pairs. For example, in the domain of customer complaints, request and response are present in the same text, from the viewpoint of a complainant. Customer complaint text can to be split into request and response text portions and then form the positive and negative dataset of pairs. In an example, all text for the proponent and all text for the opponent is combined. The first sentence of each paragraph below will form the Request part (which will include three sentences) and second sentence of each paragraph will form the Response part (which will also include three sentences in this example).

Building Ontologies from Text

Certain aspects relate to ontology construction using discourse trees and/or communicative discourse trees (CDTs). Additionally, such techniques can improve extraction of relevant text and/or entities within the text for ontology entries. Improved ontologies results in improved performance downstream applications such as search systems.

Medical records can be one of the most valuable sources of information and data on medical treatments of patients. Such records contain important items such as eligibility criteria, a summary of diagnose results, and prescribed drug which are normally recorded in unstructured free text. Extracting medical or clinical information from health records is an important task, especially with the adoption of electronic health records. These records are normally stored as text documents and contain valuable unstructured information that is essential for a better decision-making for a patient's treatment. There are three major elements that can be extracted from these clinical records: entities, attributes, and associated relations.

Automatic recognition of medical entities in unstructured text is a key component of biomedical information retrieval systems. Applications include analysis of unstructured text in electronic health records and knowledge discovery from biomedical literature. Many medical terminologies are structured as ontologies, adding relations between entities and often including several synonyms for each term.

The quality and consistency of an ontology automatically extracted from text determine an accuracy of a Decision Support System (DSS). The bottleneck of building concise, robust and complete ontologies is due to the lack of a mechanism to extract ontology entries from reliable, authoritative parts of documents. To build ontologies, reliable text fragments that express a central point of a text are used. Additionally, constructing entries from additional comments, clarifications, examples, instances and other less significant parts of text is avoided. Disclosed techniques use discourse analysis (proven useful for tasks like summarization) to select discourse units which yields ontology entries.

Usually, information retrieved is sets of entities bound by a relation. Information presented in this format is useful for many applications (mining biomedical text, ontology learning, and question answering). Ontologies structure knowledge as a set of terms with edges between them that are labeled as relational information to evoke meaningful information. Ontologies serve as the backbone of the semantic web concept which aims to provide meaningful information on the web. Ontologies can benefit from information extraction in terms of the development or population of ontologies (also known as ontology learning and population).

Discourse techniques can be used to develop ontologies or improve existing ontologies. Discourse commonly includes a sequence of sentences, but discourse can also be found even within a single sentence, for example, the connected sequence of eventualities such as actions, resultant states and events. The patterns formed by sentences of discourse provide additional information over the sum of separate parts of the discourse. For example, each sentence in the following example is a simple assertion: "Don't worry about the water source exhausting today. It is already tomorrow in some parts of the Earth." The second sentence is connected with the first sentence with the rhetorical relation of Reason for not worrying.

Discourse analysis leverages language features, which can enable speakers to specify that they are:

1) talking about something they have talked about before in the same discourse;
2) indicating a relation that holds between the states, events, beliefs, etc. presented in the discourse; or
3) changing to a new topic or resuming one from earlier in the discourse.

Language features that allow a speaker to specify a relation that holds between the states, events, beliefs, etc. presented in the discourse include subordinating conjunctions such as 'until' or 'unless' and discourse adverbials such as 'as a result', as in the following: "Birds have wings. As a result, they can fly unless they are too heavy and wings cannot support their weight." Language features in discourse also give speakers an opportunity to specify a change to a new topic or resumption of an earlier one including what can be referred to as cue phrases or boundary features.

Discourse can be associated with a sequence of sentences which:

1) conveys more than its individual sentences through their relationships to one another; or
2) leverages special features of language that enable discourse to be more easily understood.

Discourse can be structured by its topics, each comprising a set of entities and a limited range of things being said about them. Topic structure is common in the expository text found in schoolbooks, encyclopedias and reference materials. A topic can be characterized by the question it addresses. Each topic involves a set of entities, which may (but does not have to) change from topic to topic. Here the entities consist of gliders; then gliders, their pilots, and passengers; then gliders and their means of propulsion; and then gliders and their launch mechanisms. This aspect of structure has been modeled as entity chains.

An entity chain includes a sequence of expressions that refer to the same entity. For example, there are several entity chains in the text about a flu: flu→virus→vitamins→their→drinking more liquids→high temperature. Where a sequence of entity chains terminates and another set begin can be used as an indicator that the discourse has moved from one topically oriented segment to another. This is useful for tuple extraction logic in the process of ontology formation from text.

Some discourse units are more valuable for ontology entries than others. For example, consider the following sentence: I went to see a pulmonologist, because I suspected tuberculosis, as my mom asked me to do.

Figure 16:
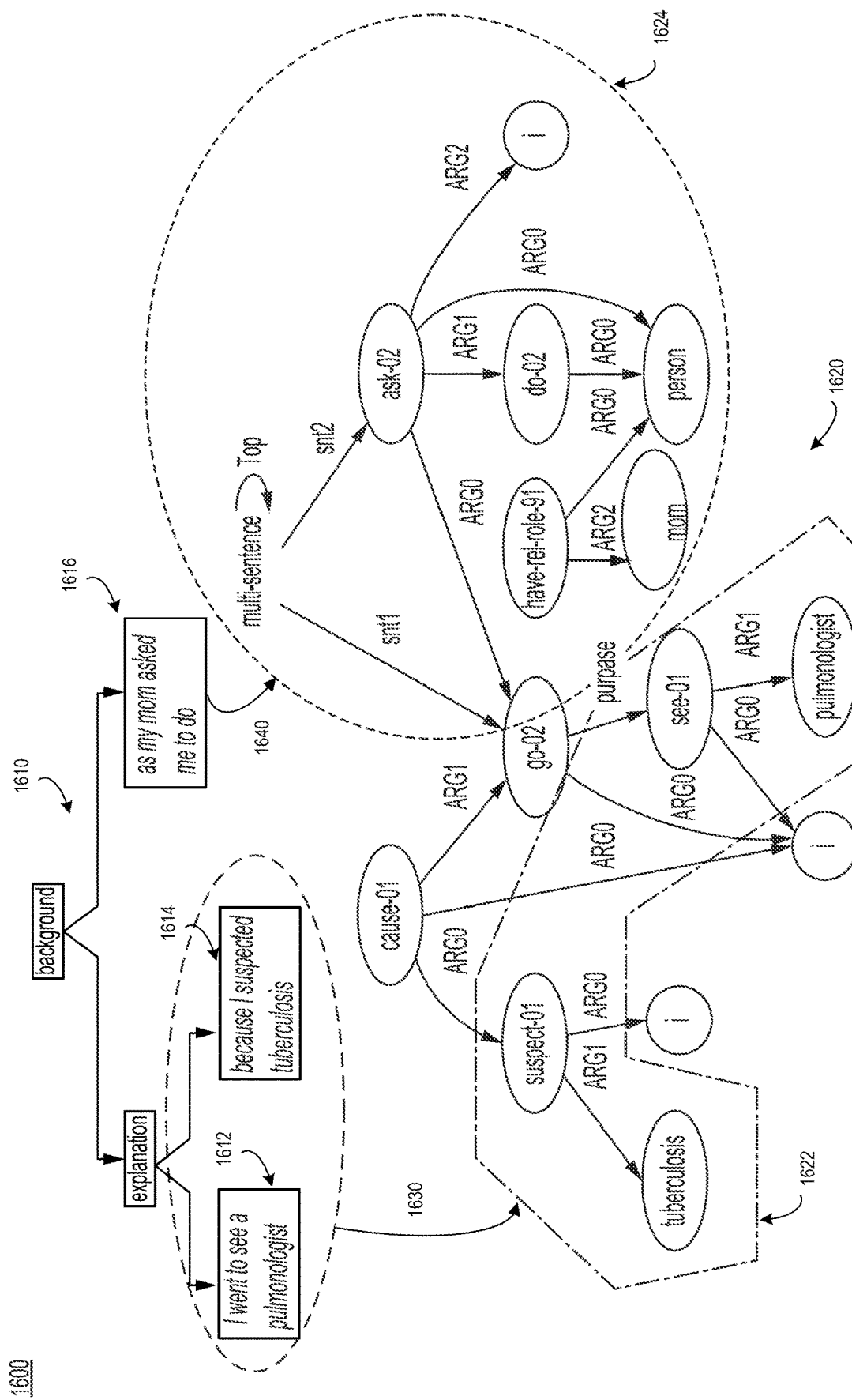
FIG. 16 depicts an example of extracting a logical clause from text, in accordance with an aspect of the present disclosure.

FIG. 16 depicts an example of extracting a logical clause from text, in accordance with an aspect of the present disclosure. FIG. 16 depicts discourse tree 1610 and Abstract Meaning Representation (AMR) tree 1620, which are linked by relations 1630 and 1640.

Discourse tree 1610 represents the text "I went to see a pulmonologist because I suspected tuberculosis as my mom asked me to do." Discourse tree 1620 includes elementary discourse unit 1612 ("I went to see a pulmonologist"), elementary discourse unit 1614 ("because I suspected tuberculosis"), and elementary discourse unit 1616 ("as my mom asked me to do").

The first part of the sentence, "I went to see a pulmonologist because I suspected tuberculosis" is useful, while the second part of the sentence, "as my mom asked me to do" is not. Therefore in forming an ontology, the first part of the sentence would be used. A nucleus elementary discourse unit can indicate the more useful part of the text.

AMR tree 1620 includes two parts: part 1620 and part 1622. Part 1620 corresponds to elementary discourse units 1612 and 1614 and part 1622 to elementary discourse unit 1616. Part 1624 corresponds to elementary discourse unit 1616.

A logical clause can be a reliable hint to extract and formalize an assertion from text. Part 1620 is extracted as a candidate for ontology entry. To the extent there are explicit logical connections between phrases, these connections should be captured in an ontology. Conversely, irrelevant circumstances or facts, such as part 1622, should not be included. The following logical clause is extracted: suspect (tuberculosis)→see(pulmonologists).

Figure 17:
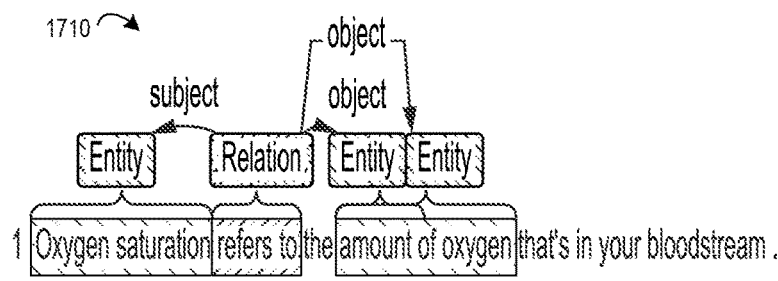
FIG. 17 depicts examples of entity relation charts, in accordance with an aspect of the present disclosure.
Figure 17:
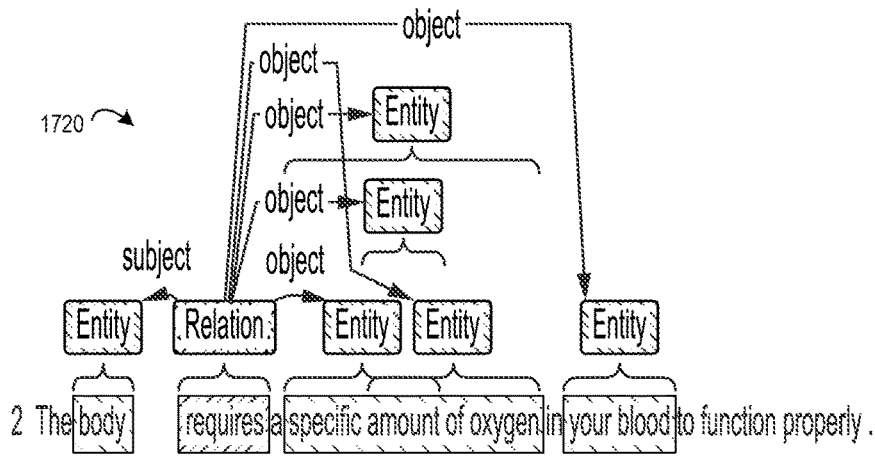
Figure 17:
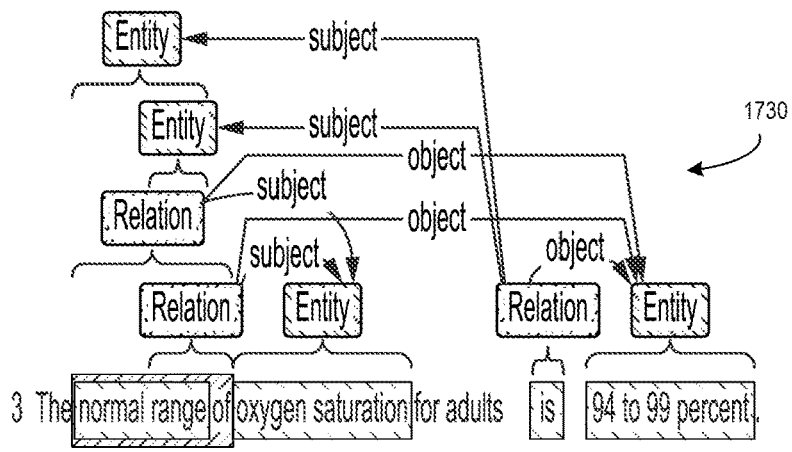
Figure 17:
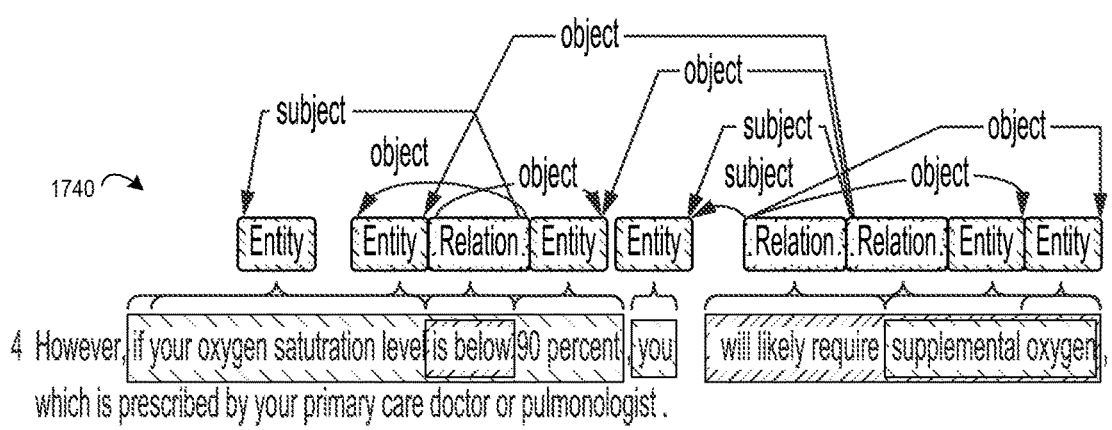

FIG. 17 depicts examples of entity relation charts, in accordance with an aspect of the present disclosure. An entity relation chart illustrates relationships of between entities in text, an ontology, or stored in a database. An entity in this context is an object, a component of data. FIG. 17 depicts entity relation charts 1710, 1720, 1730, and 1740. FIG. 17 corresponds to the following example text: "Oxygen saturation refers to the amount of oxygen that's in your bloodstream. The body requires a specific amount of oxygen in your blood to function properly. The normal range of oxygen saturation for adults is 94 to 99 percent. However, if your oxygen saturation level is below 90 percent, you will likely require supplemental oxygen, which is prescribed by your primary care doctor or pulmonologist."

As can be seen, entity relation chart 1710 corresponds to text "Oxygen saturation refers to the amount of oxygen that's in your bloodstream." Entity relation chart 1720 corresponds to text "The body requires a specific amount of oxygen in your blood to function properly." Entity relation chart 1730 corresponds to text "The normal range of oxygen saturation for adults is 94 to 99 percent." Entity relation chart 1740 corresponds to text "However, if your oxygen saturation level is below 90 percent, you will likely require supplemental oxygen, which is prescribed by your primary care doctor or pulmonologist."

An entity-relation chart can provide a set of candidate tuples to be extracted from text. A tuple is an ordered set of words in normal form (a phrase minus linguistic information). A tuple is therefore smaller in length than the sentence from which it was formed. For example, referring back to entity relation chart 1710, entities "oxygen saturation" and "amount of oxygen" are related to in a subject relationship.

An example of a discourse tree is shown below. A discourse tree can provide a logical view of which text fragments are authoritative, reliable source of relations (shown in underline below) to be recorded in an ontology, and which fragments are not (shown in brackets [ ]).
elaboration
  elaboration
    elaboration
      TEXT: [Oxygen saturation refers to the amount of oxygen,]
      TEXT: [that is in your bloodstream.]
    enablement
      TEXT: The body requires a specific amount of oxygen in your blood
      TEXT: to function properly.
  contrast (RightToLeft)
    TEXT: The normal range of oxygen saturation for adults is 94 to 99 percent.
    same-unit
      TEXT: However,
      condition (Right-to-left)
        TEXT: if your oxygen saturation level is below 90 percent,
        enablement
          TEXT: you will likely require supplemental oxygen,
          TEXT: which is prescribed by your primary care doctor or pulmonologist.

Any definitional phrases that are present in the discourse tree under Elaboration are less important and less informative. For example, the elementary discourse units "Oxygen saturation refers to the amount of oxygen" and "that is in your bloodstream" can yield:

oxygen(saturation)=oxygen(amount)

However, this gives an unreliable synonymy between saturation and amount The term "amount" is not a central entity. In this particular case, "saturation" is a specific term that is associated with a very broad term "amount." Therefore, this term should not form an ontology entry as "amount" is too common and can be associated with any value. Discourse analysis informs that that this link should not be turned into an ontology entry. For instance, definitions of entities or attributes which are assumed or explained outside of the text should not be extracted from a given text. If a text is on extension of a tax return filing, an ontology should acquire an association between 'tax' and 'extension of time' but not 'tax' and 'return' which can be assumed and in some cases would have been previously extracted from an introductory documents on accounting.

By contrast, the more important phrases to form ontology entries occur in EDUs for non-trivial relations other than Elaboration and Joint:
condition→ontology rule
level(oxygen( ), saturation)→require(patient, oxygen (supplemental))
enablement
enable(doctor(primary_care), oxygen(supplemental))
enable(pulmonologist( ), oxygen(supplemental))
contrast: extract from nucleus (usual, normal, typical part)
level(oxygen( ), saturation)=94 . . . 99

Figure 18:
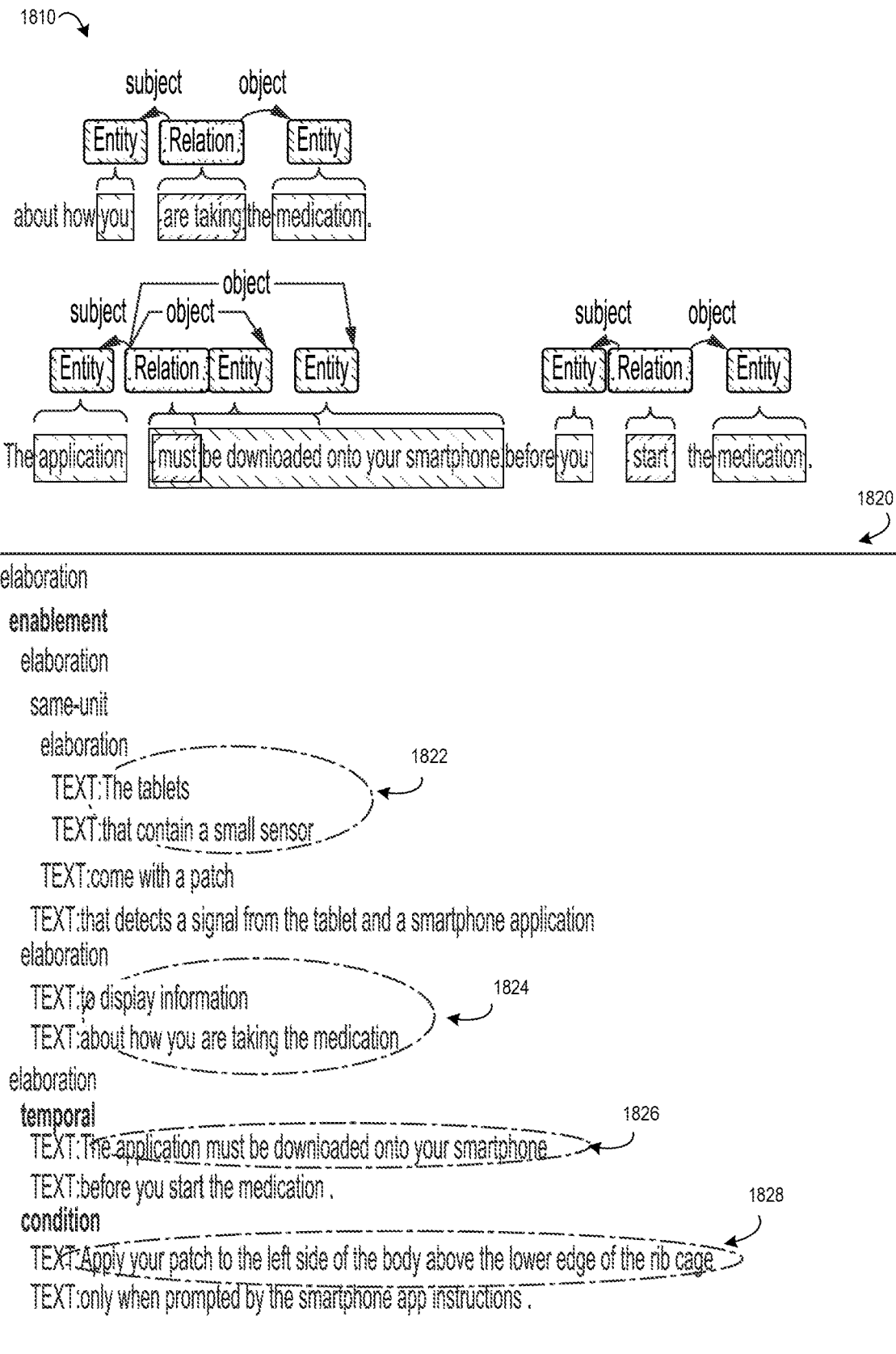
FIG. 18 depicts an entity graph and a discourse tree, in accordance with an aspect of the present disclosure.

FIG. 18 depicts an entity graph and a discourse tree, in accordance with an aspect of the present disclosure. FIG. 18 depicts entity relation graph 1810 and discourse tree 1820.

Entity relation graph 1810 illustrates relations within entities of the following phrases " . . . about how you are taking the medication" and "The application must be downloaded onto your smartphone before you start the medication." More specifically, "you" is related to "are taking" by relation subject, which is in turn related to "medication" by relation object.

Discourse tree 1820 represents the following text: "The tablets that contain a small sensor come with a patch that detects a signal from the tablet and a smartphone application to display information about how you are taking the medication. The application must be downloaded onto your smartphone before you start the medication. Apply your patch to the left side of the body above the lower edge of the rib cage only when prompted by the smartphone app instructions."

The text identified by dotted lines, e.g., text 1822, 1824, 1826, and 1828 illustrates the central phrases where extracted relations are informative and express the central topic of this text. By contrast, the other text in discourse tree 120 includes phrases which should not yield entity tuples as this other text is only informative when attached to the central phrases.

In the discourse tree, the central phrase tablet-contain-sensor corresponds to the nucleus EDU of the top-level rhetorical relation of Enablement. This phrase talks about the tablet which is a central topic of this text, and its predicate and object/attribute 'contain a small sensor'. The other important phrase associated with the main entity node 'The tablets' is 'to display information about how you are taking the medication'.

The satellite EDUs contain phrases that cannot be properly interpreted in a stand-alone mode. 'Come with a patch that detects a signal' must be interpreted in the context of the tablet. Otherwise, a hypothetical ontology entry detect (patch, signal) is too general and does not necessarily hold on its own. A consistent ontology should not generalize from this expression. Nucleus EDUs are interpretable on their own and can form an ontology entry, whereas satellite EDUs should not form an ontology entry.

Finally, the following ontology entries can be extracted:
  contain(tablet, sensor(small))
  display(information(take(people, medications)))

Events can be annotated. For example, expressions stating bio-medical events, defined as changes in the state or properties of physical entities, can be annotated.

Figure 19:
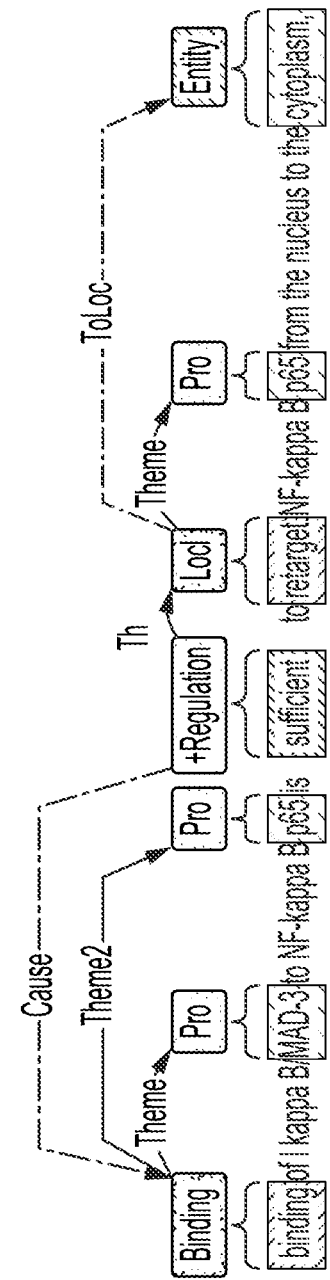
FIG. 19 depicts an example of event annotation, in accordance with an aspect of the present disclosure.

FIG. 19 depicts an example of event annotation, in accordance with an aspect of the present disclosure. FIG. 19 depicts entity graph 1900 that is annotated with events such as "cause" or "theme." An event is an interaction between entities. In a general domain, events are formalized via event calculus as sequences of states that have pre-conditions and resultant conditions. Examples of events include a chemical reaction, an interaction between proteins, between proteins and DNA, or any other kind of interaction between entities.

Event annotations are text-bound association of arbitrary numbers of entities in specific roles (e.g. Theme, Cause). The annotation tags can overlap with rhetorical relations.

Entity graph 1900 is an annotated version of the sentence "The binding of I kappa B/MAD-3 to NF-kappa B p65 is sufficient to retarget NF-kappa B p65 from the nucleus to the cytoplasm."

Figure 20:
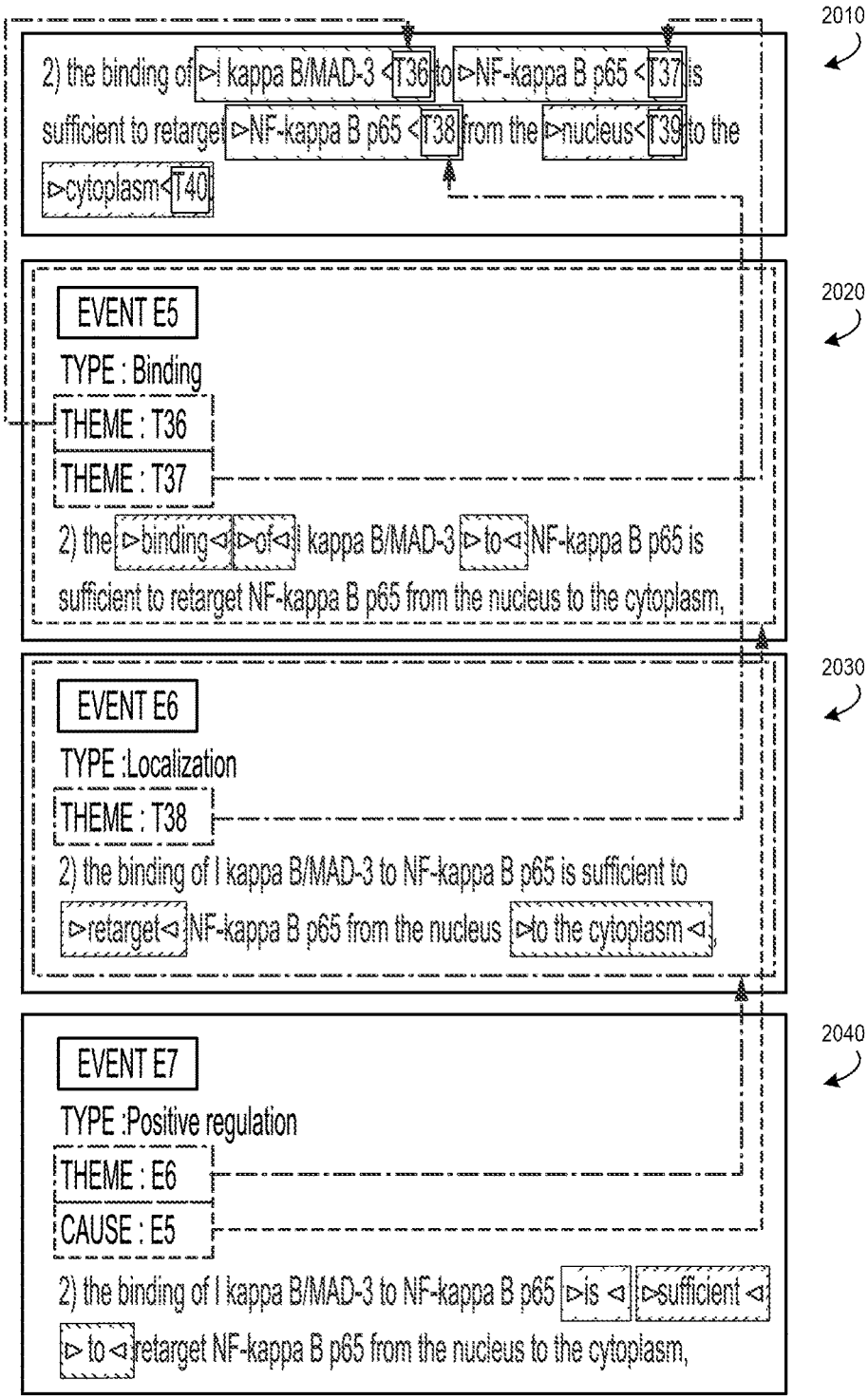
FIG. 20 depicts an example visualization of annotation, in accordance with an aspect of the present disclosure.

FIG. 20 depicts an example visualization of annotation, in accordance with an aspect of the present disclosure. FIG. 20 includes visualizations 2010, 2020, 2030 and 2040, which together illustrate the annotation of the following sentence, also depicted in FIG. 19: 'The binding of I kappa B/MAD-3 to NF-kappa B p65 is sufficient to retarget NF-kappa B p65 from the nucleus to the cytoplasm.'

Visualizations 2020, 2030 and 2040 display an event annotation that has been added to the sentence. The original sentence is shown inside each of those boxes to show text spans that belong to the corresponding annotation. Biological entities, which had been annotated earlier during term annotation, are shown. For example, "I kappa B/MAD-3" and "NF-kappa B p65" are protein molecules. "Nucleus" and "cytoplasm" are cell components. The terms are expressed as n-tuples of attribute-value pairs as follows:

(Id: T36, Class: Protein_molecule, Name: I kappa B/MAD-3)
(Id: T37, Class: Protein_molecule, Name: NF-kappa B p65)
(Id: T38, Class: Protein_molecule, Name: NF-kappa B p65)
(Id: T39, Class: Cell_component, Name: nucleus)
(Id: T40, Class: Cell_component, Name: cytoplasm)

The first event E5 represents binding of the two entities, T36 (I kappa B/MAD-3) and T37 (NF-kappa B p65). This indicates an indication to the binding event. The Theme in an event is an attribute or slot to be filled by an entity or entities whose properties are affected by the event. The second event E6 represents localization of the protein T38. The textual indications, retarget and 'to the cytoplasm', are marked up as key expressions ranging over the event type and the location relevant to the event, respectively. The last event E7 is the causality relation between E5 and E6. That is, the binding event (E5) of the two proteins "causes" the localization event (E6) of one of the two proteins. This causality relation is represented as an event of type Positive_regulation.

Regulation has a broader definition than regulatory events in a strict biological sense, e.g., catalysis, inhibition, up-/down-regulation, etc. General causality among events can be encoded. The expression 'is sufficient to' turns out to be a syntactic cue for causality.

Figure 21:
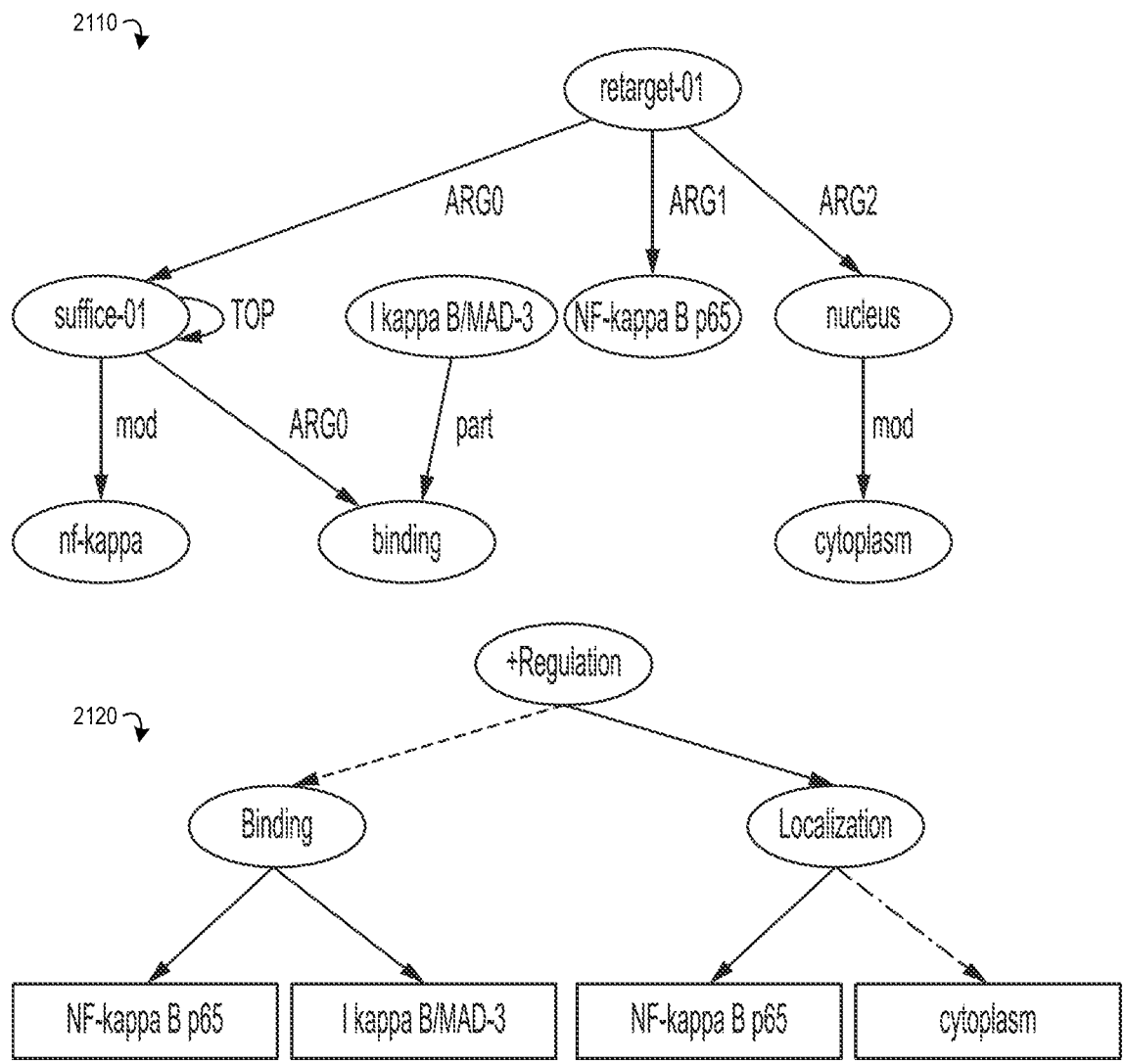
FIG. 21 depicts an abstract meaning representation graph and an event taxonomy, in accordance with an aspect of the present disclosure.

FIG. 21 depicts an abstract meaning representation graph and an event taxonomy, in accordance with an aspect of the present disclosure. FIG. 21 depicts abstract meaning representation graph 2110 and event taxonomy 2120 for visualization 2000.

Event taxonomy 2120 illustrates ontology entities in rectangular boxes and event entities are shown in circles. The arrows indicate links between events and themes. Links between events and cause exist between "Regulation" and "Binding." Links between events and location exist between "localization" and "cytoplasm."

Phrase aggregation takes a list of phrases and merges synonymous and related phrases to form meaningful ontology entries. The aggregator outputs a hierarchical structure of phrase entities obtained by means of generalization of phrase instances. Phrase aggregation can include multiple functions such as a phrase filter and a phrase grouper. The phrase filter can include a Sentiment filter, a Type of phrase filter (NP, VP), a Phrase length filter (2-6 words), Noun Entity filter (no proper nouns), an occurring POS filter (no CD, no PRP, etc.), a frequency analysis filter, a Prohibited phrases (manually set) filter, a Phrase normalization filter. The phrase grouper includes a head noun phrase extractor, a phrase generalizer, a phrase merger and a Phrase Aggregator and categorizer. Phrase aggregation results in generalized phrases.

The following phrase filtering rules can be used:
1) Only extract noun, verb and prepositional phrases;
2) Exclude phrases with sentiments because they can occur in opinionated context;
3) Name entities are excluded, because name entities cannot be generalized across properties. However specific types of such proper nouns are included in connection with relation specific to health domain such as affect/cure/drug-for/followed-by and others;
4) numbers and prepositions are excluded;
5) there is a limit on phrase length;
6) too frequent phrases and too rare phrases are removed;
7) phrases which start with an article if they are short are avoided; or
8) strings which are not words are cleaned/normalized;

Once the phrases are extracted, they are clustered and aggregated to obtain a reliable, repetitive instances. Phrases which only occur once are unreliable and considered to be "noise". For example, a hierarchy is formed from a list of phrases:

insulin-dependent diabetes mellitus,
adult-onset dependent diabetes mellitus,
diabetes with almost complete insulin deficiency
diabetes with almost complete insulin deficiency and strong hereditary component Head noun extraction can occur as follows: if two phrases have the same head noun, the phrases can be combined into one category. If two phrases within a category have other nouns or adjectives in common besides the head noun, a subcategory is formed from these common nouns. In this respect, the cognitive procedure of induction is followed, finding a commonality between data samples, retaining the head noun, such as diabetes.

Figure 22:
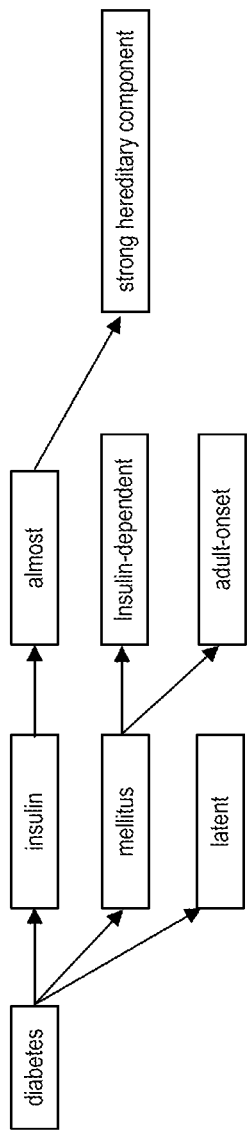
FIG. 22 depicts aggregation of phrases to obtain a hierarchy, in accordance with an aspect of the present disclosure.

FIG. 22 depicts aggregation of phrases to obtain a hierarchy, in accordance with an aspect of the present disclosure. Phrase aggregation 2200 illustrates the following class, subclasses and sub-subclasses:
diabetes
  mellitus
  insulin-dependent Using an entity grid to help extract relationships. A coherent text binds sentences together to express a meaning as a whole: the interpretation of a sentence usually depends on the meaning of neighbor sentences. Coherence models that can distinguish a coherent from incoherent texts; this capability have a wide range of applications in text generation, summarization, and coherence scoring. A coherence model can tell which phrases and sentences are good sources for an ontology entry, and which phrases are not. Coherence is measured in various discourse models such as rhetorical structure theory (RST). In RST, coherence can be measured as averaged confidence score for recognized rhetorical relations. In other discourse theories, coherence can be measured as propagation of an entity. If an entity abruptly appears and then disappears in text, coherence score is low An entity grid represents a text by a grid that captures how grammatical roles of different entities change from sentence to sentence. The grid is then converted into a feature vector containing probabilities of local entity transitions, which enables machine learning models to learn the degree of importance of each entity occurrence.

Figure 23:
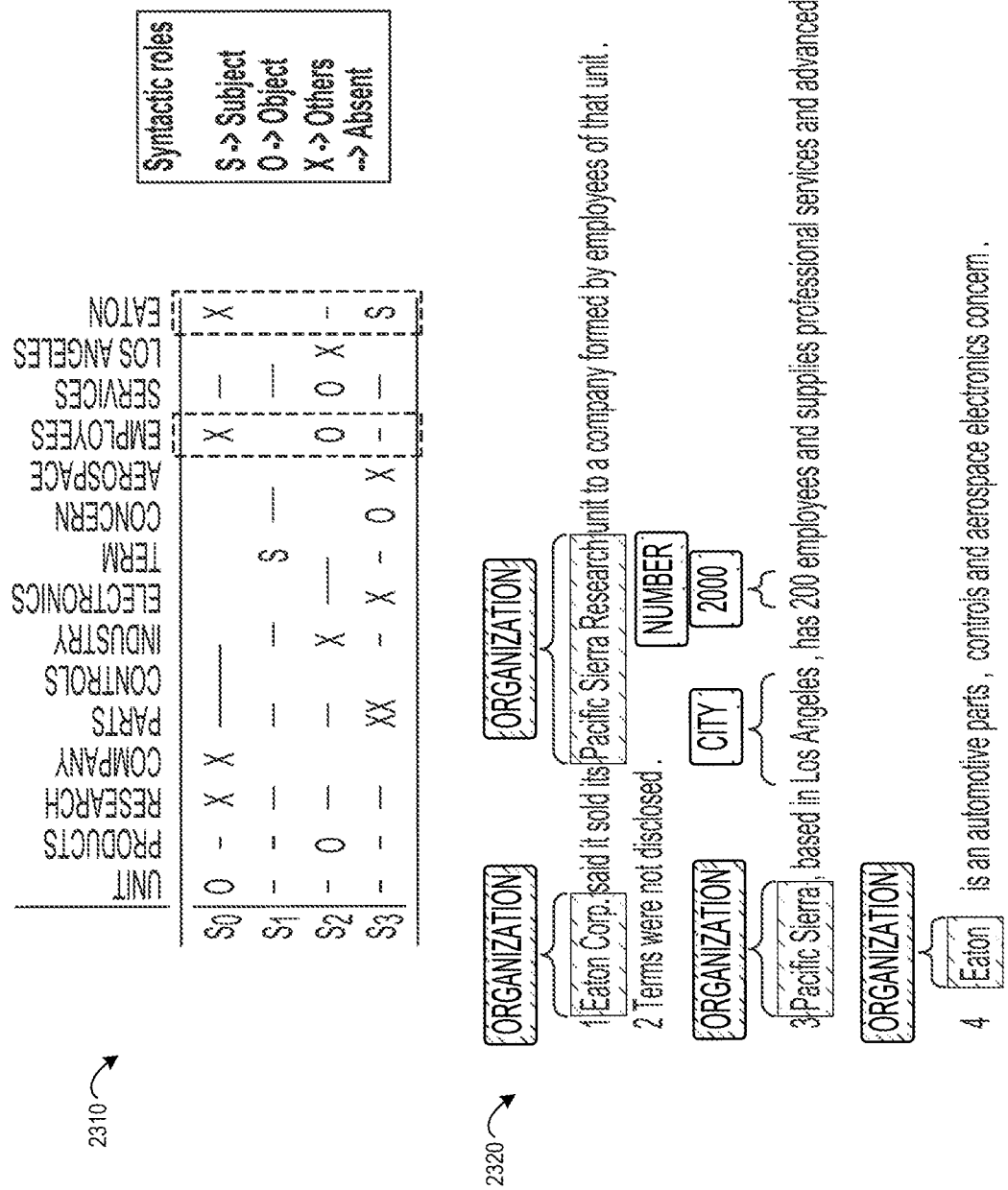
FIG. 23 depicts entity grid matrix, in accordance with an aspect of the present disclosure.

FIG. 23 depicts an entity grid matrix, in accordance with an aspect of the present disclosure. FIG. 23 depicts entity grid matrix 2310 with resulting annotations in sentence 2320. As can be seen, entity grid matrix includes, for each sentence s0-s3, entities in columns. It is desirable to extract the most complete tuple of objects connected by a relation. The matrix refers to four sentences: s0, s1, s2, and s3, as follows:

s0: Eaton Corp. said it sold its Pacific Sierra Research unit to a company formed by employees of that unit.
s1: Terms were not disclosed.
s2: Pacific Sierra, based in Los Angeles, has 200 employees and supplies professional services and advanced products to industry.
s3: Eaton is an automotive parts, controls and aerospace electronics concern.

For each sentence, a given entity is selected with "S" if the entity is the subject, "O" if the entity is the object, "X" if it is another type of entity, and "—" if absent. Therefore, for sentence s0, "company" is marked as "company" is present in the sentence.

The annotations for sentence 2320 include marking various references to "Eaton" and "Pacific Sierra Research" as organizations, a type of entity.

The following tuples are extracted:
s0: sell(eaton, unit, company).
s3: employ(pacific_sierra, 200).

Figure 24A:
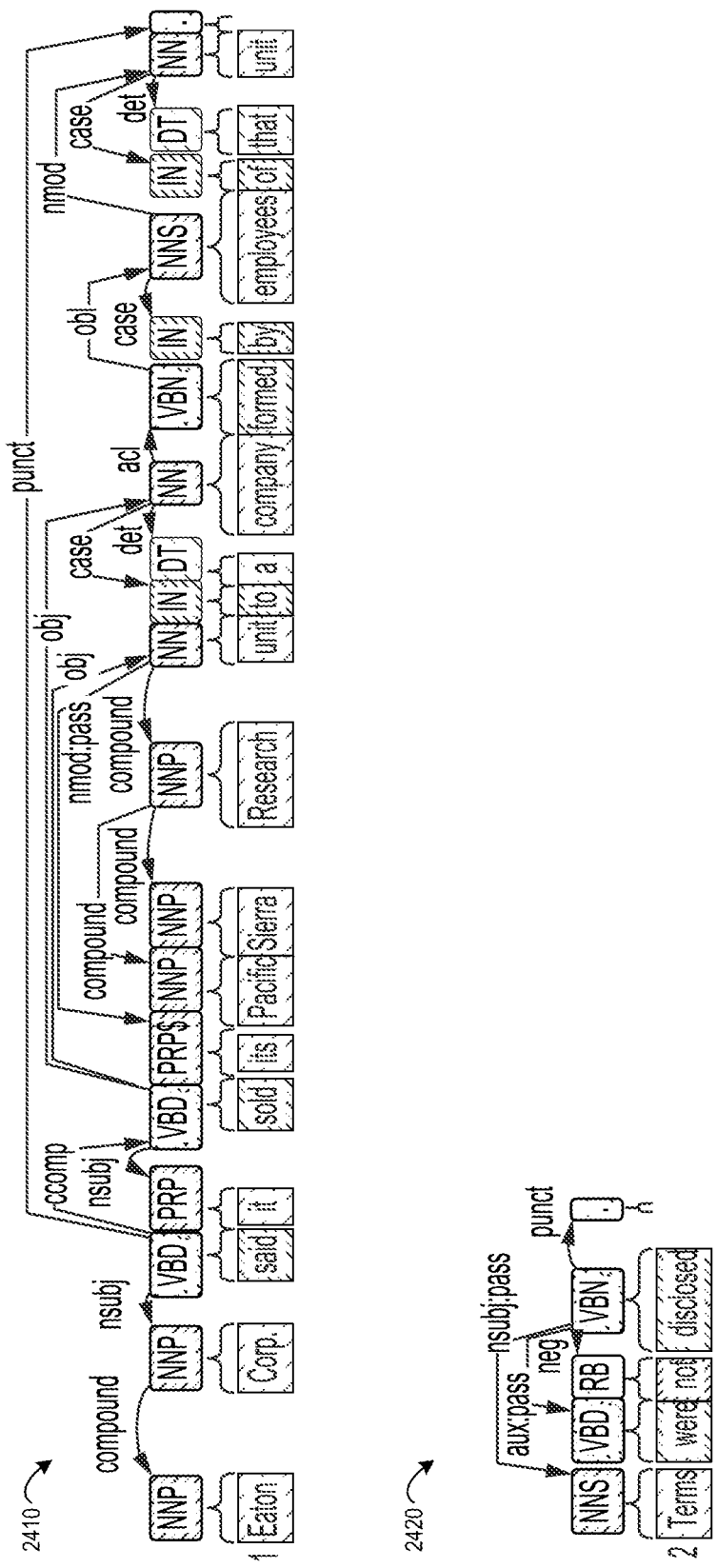
FIGS. 24A 24B, depicts syntactic trees, in accordance with an aspect of the present disclosure.
Figure 24B:
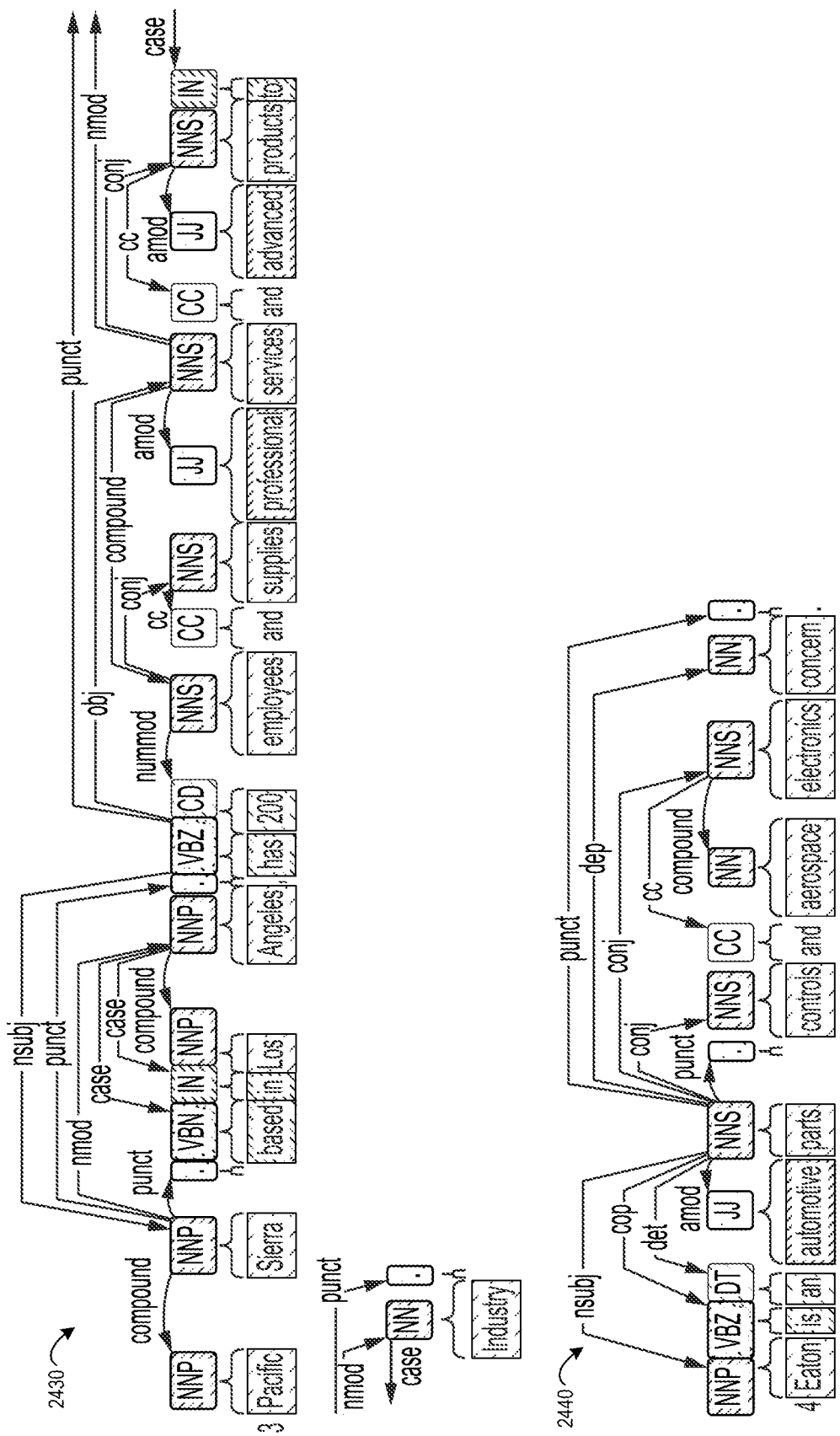

FIG. 24, which includes FIGS. 24A and 24B, depicts a syntactic tree, in accordance with an aspect of the present disclosure. FIG. 24 includes syntactic trees 2410, 2420, 2430, and 2440. The syntactic trees correspond to sentences s0, s1, s2, and s3 referred to in FIG. 23.

Syntactic tree 2410 represents the text "Eaton Corp. said it sold its Pacific Sierra Research unit to a company formed by employees of that unit." Syntactic tree 2420 represents the text "Terms were not disclosed." Syntactic tree 2430 represents the text "Pacific Sierra, based in Los Angeles, has 200 employees and supplies professional services and advanced products to industry." Syntactic tree 2440 represents the text "Eaton is an automotive parts, controls and aerospace electronics concern."

Figure 25:
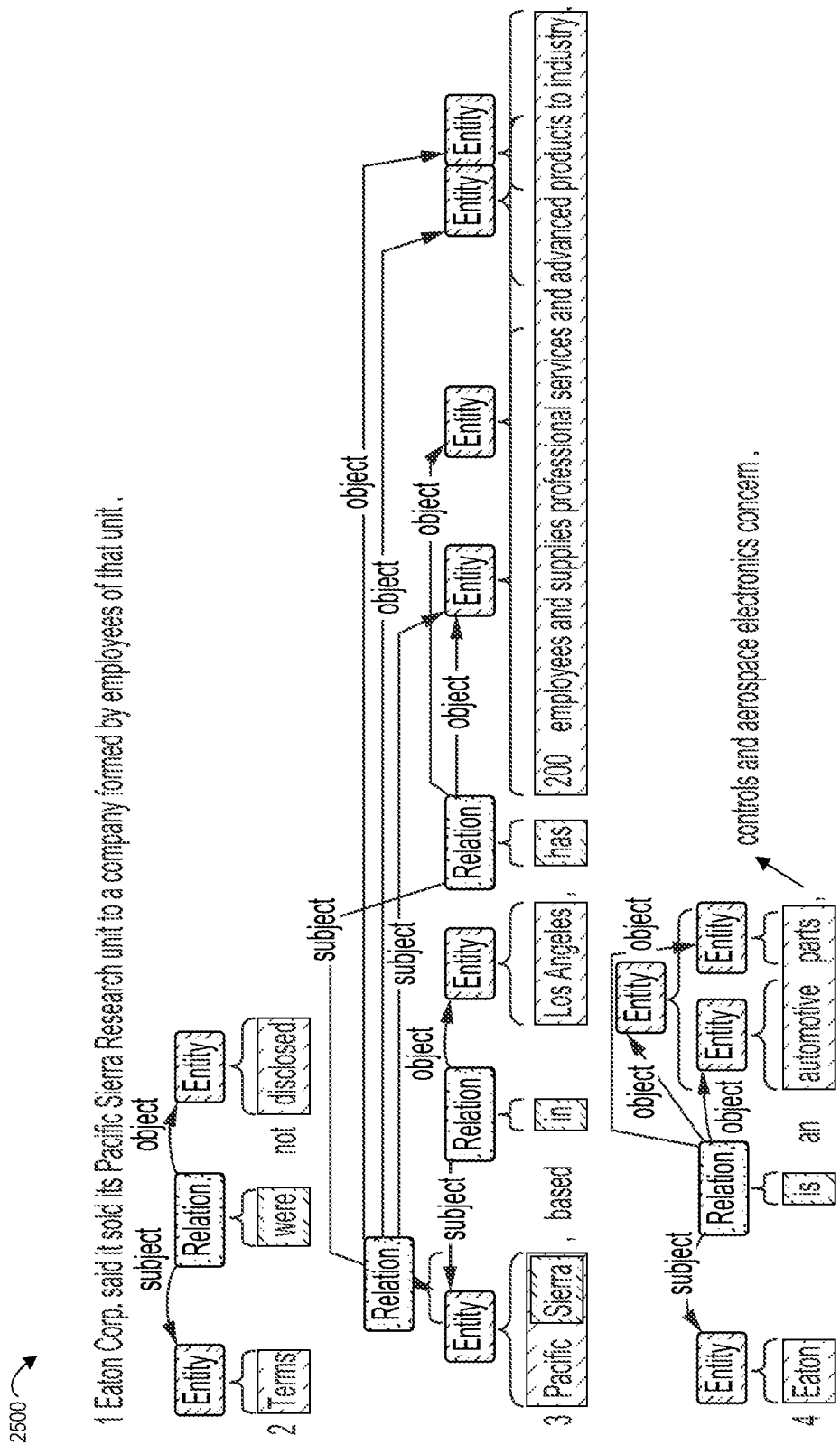
FIG. 25 depicts an entity relationship graph, in accordance with an aspect of the present disclosure.

FIG. 25 depicts an entity relationship graph, in accordance with an aspect of the present disclosure. FIG. 25 depicts entity relationship graph 2500 for the sentences s0, s1, s2, and s3 referred to in FIGS. 23 and 24.

Figure 26:
FIG. 26 depicts an additional entity relationship graph, in accordance with an aspect of the present disclosure.

FIG. 26 depicts and additional entity relationship graph, in accordance with an aspect of the present disclosure. FIG. 26 depicts entity relationship graph 2600, which depicts entities within sentence s3. As compared to entity relationship graph 2500, entity relationship graph 2600 is further annotated with details such as organization type.

Figure 27:
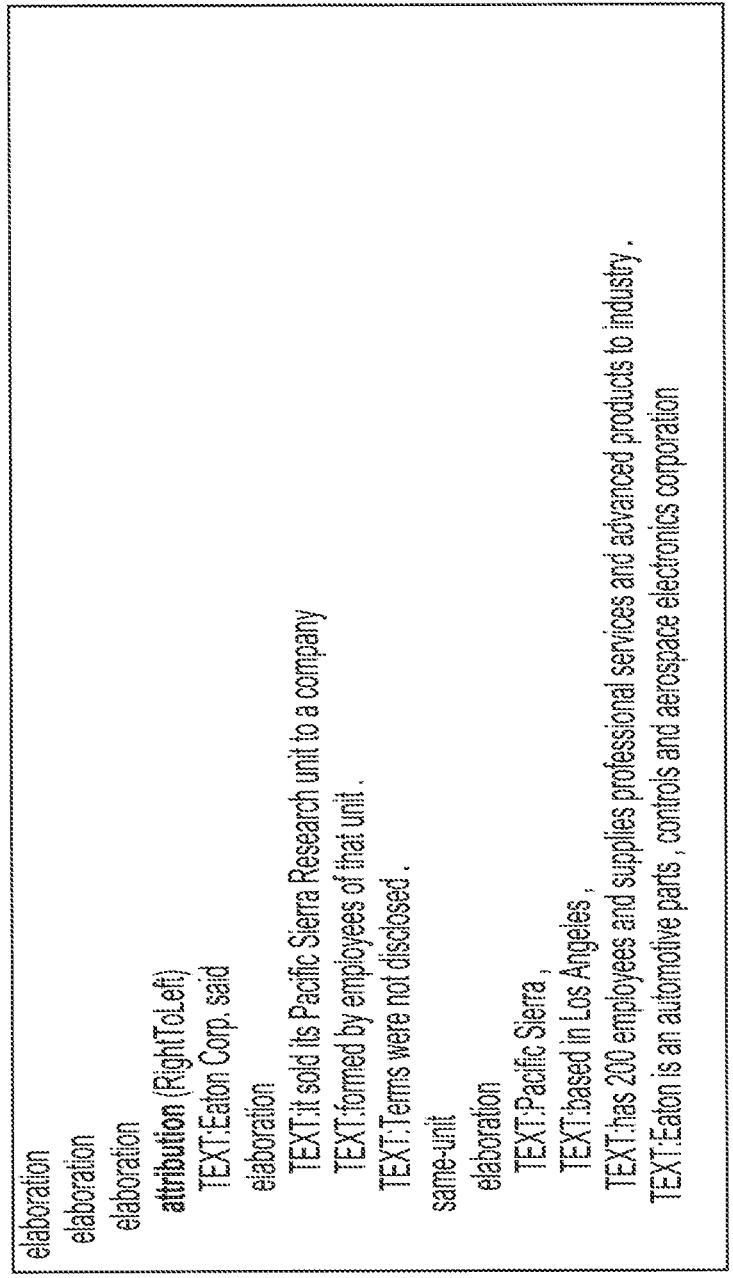
FIG. 27 depicts a discourse tree, in accordance with an aspect of the present disclosure.

FIG. 27 depicts a discourse tree, in accordance with an aspect of the present invention. Discourse tree 2700 corresponds to the text discussed with respect to FIGS. 23-25 above.

Figure 28:
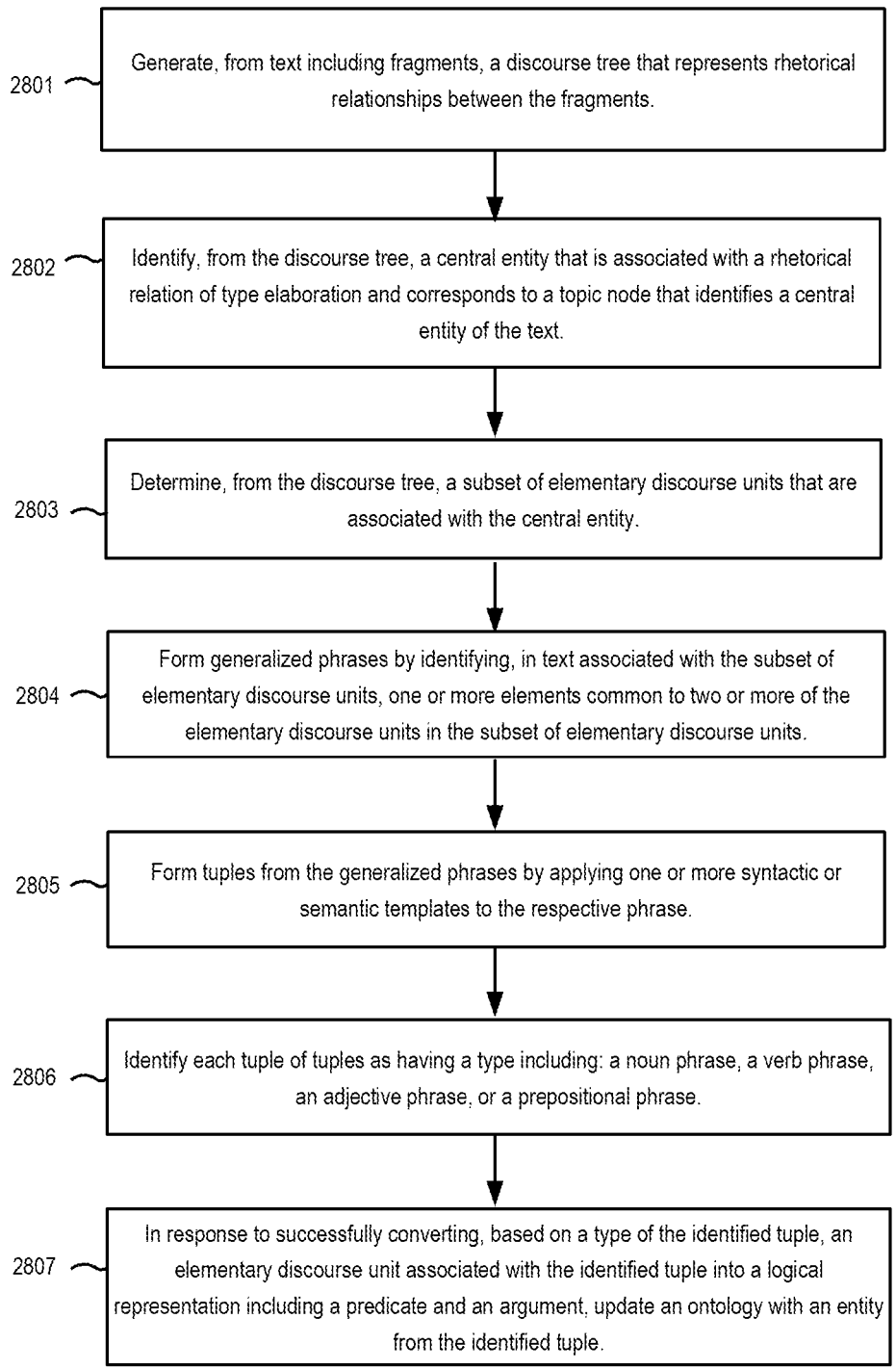
FIG. 28 is a flowchart of an exemplary process for augmenting an ontology, in accordance with an aspect of the present disclosure.

FIG. 28 is a flowchart of an exemplary process 2800 for augmenting an ontology, in accordance with an aspect of the present disclosure. Process 2800 can be implemented by application 122.

At block 2801, process 2800 involves generating, from text including fragments, a discourse tree that represents rhetorical relationships between the fragments. The discourse tree includes nodes, each nonterminal node representing a rhetorical relationship between two of the fragments, and each terminal node of the nodes of the discourse tree being associated with one of the fragments. At block 2801, process 2800 involves substantially similar operations to block 1501 and 1502 of process 1500.

In some cases, a communicative discourse tree (CDT) is generated at block 2801. In that case, process 2800 involves substantially similar operations to block 1501-1505 of process 1500. In some cases, CDTs can inform operations performed in process 2800 over the capabilities of discourse trees alone. For instance, a communicative action in a CDT generated at block 2801 can form a subject of the corresponding elementary discourse unit. For example, the subject "she" in the sentence "she told me the sky is blue" can be identified as important by the corresponding communicative action. From there, even if a subject of a satellite elementary discourse unit, traditionally viewed as less informative, can indicate that the satellite is in fact informative. In this respect, a communicative action can override a traditional view of extracting text from a nucleus EDU only.

Returning to process 2800, at block 2802, process 2800 involves identifying, from the discourse tree, a central entity that (i) is associated with a rhetorical relation of type elaboration and (ii) corresponds to a topic node that identifies a central entity of the text. A topic node is identified from the discourse tree (or communicative discourse tree). To identify a topic, the application 122 calculates, for each node of the terminal nodes of the tree, a respective path length from the root node. As depicted in FIG. 27, the root node is the first "elaboration" node.

Continuing the example, the application 122 identifies, from terminal nodes, a topic node by identifying a node that has a path length that is a smallest path length of the path lengths. The application 122 then determines, from the topic node, a topic of the discourse tree by extracting a noun phrase from the nucleus elementary discourse unit associated with the topic node. The noun phrase is the central entity.

An example of a central entity, referring back to FIG. 27, is "Eaton Corp." The central entity can be found in the elementary discourse unit "Eaton Corp. said." In another example, for the text "sky is blue," the central entity is identified as "sky."

At block 2803, process 2800 involves determining, from the discourse tree, a subset of elementary discourse units that are associated with the central entity. A discourse tree could have one or more elementary discourse units that are associated with the central entity.

Determining an association between an elementary discourse unit and the central entity can involve textual analysis of elementary discourse units that are associated of type nucleus and are associated with a non-trivial rhetorical relation. Examples of non-trivial relations are those which are not of type elaboration or joint. For example, application 122 identifies, from the discourse tree, elementary discourse units that are (i) of type nucleus and (ii) not default relations, e.g., associated with or joined to a rhetorical relation that is not of type "elaboration" or "joint."

Referring back to FIG. 27, elementary discourse units of type nucleus include "It sold its Pacific Sierra . . . ," "Pacific Sierra . . . ," and "Eaton is an automotive parts . . . ."

At block 2804, process 2800 involves identifying, in text associated with the subset of elementary discourse units, one or more elements common to two or more of the elementary discourse units in the subset of elementary discourse units. Identifying elements in common can involve generalization.

For two words of the same part of speech (POS), their generalization is the same word with the POS. If the lemmas for the two words are different, but the POS is the same, then the POS remains in the result. If lemmas are the same, but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation, but indicate the above instantiation of predicates with arguments.

Consider the following two sentences "camera with digital zoom" and "camera with zoom for beginners." To express the meanings, the following logic predicates are used:
camera(name_of_feature, type_of_users) and
zoom(type_of_zoom).

Note that this is a simplified example, and as such, may have a reduced number of arguments as compared to more typical examples. Continuing the example, the above expressions can be represented as:
camera(zoom(digital), AnyUser), and
camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), AnyUser).

At the syntactic level, the expressions are subjected to a generalization ('^') of two noun phrases as: {NN-camera, PRP-with, [digital], NN-zoom [for beginners]}. The expressions in square brackets are eliminated because they occur in one expression, but do not occur in the other. As a result, obtain{NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions, so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models (Mikolov et al., 2015), compute generalization of two different words, the following rule is used. If subject1=subject2, then subject1^subject2=<subject1, POS (subject1), 1>. Otherwise, if they have the same part-of-speech, subject1^subject2=<*, POS(subject1), word2vecDistance(subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example,
"To buy digital camera today, on Monday."
"Digital camera was a good buy today, first Monday of the month."

Generalization is {<JJ-digital, NN-camera>, <NN-today, ADV, Monday>}, where the generalization for noun phrases is followed by the generalization for an adverbial phrase. Verb buy is excluded from both generalizations because it occurs in a different order in the above phrases. Buy—digital—camera is not a generalization phrase because buy occurs in different sequence with the other generalization nodes.

In another example,
"movie from spain"
and "movie from italy"
then generalization is "movie from [COUNTRY]" everything that is common remains; everything that is different is removed.

The rationale for removing common elements is that it is helpful to locate the an element in multiple sources for increased reliability. Therefore, only the common elements are maintained.

At block 2805, process 2800 involves forming tuples from the generalized phrases by applying one or more syntactic or semantic templates to the respective phrase. Examples of templates include:
<drug_entity1> is a generic substitute for <drug entity2>
<entity1> concentration is affected by dissolution of <entity 2>
<entity1> is a <class_of_entity>

As mentioned above, tuples are a phrase with linguistic information removed, in normal form. Normal form includes verbs being in the infinitive and nouns being in the nominative singular. For example, consider the text "all skies are blue," "sky is blue," and "sky has a blue color." These phrases are represented by the tuple "sky blue," which is in a noun-adjective form. Note that each tuple has a one to one correspondence with a phrase.

At block 2806, process 2800 involves identifying a tuple of tuples as having a type comprising: a noun phrase, a verb phrase, an adjective phrase, or a prepositional phrase.

A noun phrase (NP) is a syntactic element (e.g., a clause) with the function of a noun (such as the subject of a verb or the object of a verb or preposition). An example of noun phrase in a sentence is "I found the owner of the dog," where "the owner of the dog" is a noun phrase. A verb phrase is a portion of a sentence that contains both the verb and either a direct or indirect object (the verb's dependents) "He appears on screen as an actor." An adjective phrase is a group of words headed by an adjective that describes a noun or a pronoun. An example of an adjective phrase is "She is rather fond of skiing." A prepositional phrase is a modifying phrase including a preposition and its object. "Before going home, go to the store."

Application 122 can identify whether text includes a noun phrase, verb phrase, adjective phrase, or prepositional phrase. For instance, a syntactic tree can be formed from text. From the syntactic tree, which identifies parts of speech, application 122 can determine a type of phrase. If the tree includes a verb, then the phrase is a verb phrase. If a phrase starts with an adjective, then the phrase is an adjective phrase. If the phrase starts with a preposition, then the phrase is a prepositional phrase. Otherwise, the phrase is a noun phrase.

In some cases, machine learning techniques can be used to determine whether a given phrase is a noun phrase, verb phrase, adjective phrase, or prepositional phrase. For example, the phrase is provided to trained machine learning model 124, which outputs a phrase type classification.

At block 2807, process 2800 involves in response to successfully converting, based on a type of the identified tuple, an elementary discourse unit associated with the identified tuple into a logical representation including a predicate and an argument, updating an ontology with an entity from the identified tuple.

As used herein, a logical predicate represents a property or a relation. For example, considering the phrase "sky blue," the word "sky" is a predicate because "sky" is a head noun. A predicate can be represented as:

predicate name [argument 0 . . . n]

The conversion is based on the type of the identified tuple. For example, if the tuple is a noun phrase or a prepositional phrase, then application 122 extracts one or more of a head noun or a last noun as a logical predicate and extracting one or more other words as arguments. If the tuple is a verb phrase, then application 122 extracts a verb of the tuple as the predicate and one or more other words as arguments.

Adjective or prepositional phrases give simpler facts as ontology entries:

'lower concentration of acids'→concentration(acid, lower)

'in low indirect light'→light(low, indirect)

If the tuple indicates an adjective phrase or a prepositional phrase, a search for an internal verb phrase within the adjective or prepositional phrase is performed. If there is an embedded verb phrase in a prepositional or adjective phrase, then the tuple is formed from the internal verb phrase. If there is no internal verb phrase, then an ontology entry is not performed.

If a phrase cannot be converted into a logical representation, then the phrase cannot be used. In that case, process 2800 can be repeated to find other candidates for ontology entries.

Downstream applications include search systems, recommendation systems, decision support systems (DSSs), and diagnosis systems. For example, application 122 can receive queries from user devices. Examples of queries include questions about treatments. In response to receiving the query, application 122 can locate the entity in the ontology and providing the entity to the user device.

In an aspect, an entity can have a class. Examples of classes include entity classes include "lab test," "medicine," and "protein." Identification of a class can involve using a "word2vec" approach. For instance, machine learning model 124. Machine learning model 124 can be trained to identify an entity class. For instance, application 122 encodes tuple as a vector representation and provides the vector representation to machine learning model 124. In turn, machine learning model provides the determined entity class to application 122. The ontology can be updated with the entity class and/or provides the entity class to the user device.

In an aspect, additional grouping can be performed. For instance, tuples of the same kind are grouped to produce reliable, informative ontology entries and to minimize inconsistencies. Noun phrases are grouped with noun ones, verb with verb and propositional with propositional. The aggregation component that follows performs tuples generalization to avoid too specific, noisy entries that cannot be reliably applied with sufficient confidence.

Dictionary manager that includes identification of synonyms helps in generalizing tuples which have the same meaning but different words expressing it. Reasoning is used to cover words and multiwords which are not synonyms but imply each other in context of other words.

Evaluation

Complex domains-specific medical Q/A datasets such as MCTest, biological process modeling, BioASQ, and InsuranceQA datasets are available but they are limited in scale (500-10K) because of the complexity of the task or the need for expert annotations that cannot be crowd-sourced or gathered from the web. Seven datasets of varying complexity of questions, texts and their associations to track the contribution of each ontology construction step are combined. Q/A datasets are characterized in Table 3.

TABLE 3

The Q/A datasets we use for evaluation of the ontology construction

| Name | Description | # | Source & sample | Link |
|---|---|---|---|---|
| Medical-Question-Answer-Datasets | several sources for medical question & answer datasets from HealthTap.com | 1600000 | https://www.healthtap.com/user_questions/919966-foods-you-can-eat-with-acid-reflux-and-a-fatty-liver | https://github.com/durakkerem/Medical-Question-Answer-Datasets |
| MedQuAD: Medical Question Answering Dataset | medical question-answer pairs created from 12 NIH websites. The collection covers 37 question types (e.g. Treatment, Diagnosis, Side Effects) associated with diseases, drugs and other medical entities such as tests. | 50000 | cancer.gov, niddk.nih.gov, GARD, MedlinePlus Health Topics | https://github.com/abachaa/MedQuAD |

TABLE 3-continued

The Q/A datasets we use for evaluation of the ontology construction

| Name | Description | # | Source & sample | Link |
|---|---|---|---|---|
| Medical Q/A data | medical Q/A datasets gathered from the following websites eHealth Forum HealthTap | | iCliniq Question Doctors WebMD | https://github.com/LasseRegin/medical-question-answer-data |
| PubMedQA | Biomedical question answering dataset collected from PubMed abstracts | 275000 | Jin et al 2019 | https://pubmedqa.github.io |
| emrQA | Generated domain-specific large-scale electronic medical records datasets produced by re-purposing existing annotations on clinical notes | 1 million questions-logical form and 400,000+ question-answer evidence pairs | Pampari et al 2018 auto-generated | https://github.com/panushri25/emrQA https://www.i2b2.org/NLP/DataSets/ |
| BioASQ | Evaluation infrastructure for biomedical semantic indexing and QA | | Tsatsaronis et al 2015 | |
| GENIA | One of the most commonly used corpora on text mining specifically developed to support the construction and evaluation of IE | 2000 Medline abstracts | Kim et al 2003 | http://www.nactem.ac.uk/genia |

When ontology entries are extracted arbitrarily from noisy data, some entries contradict to each other. The frequency of contradiction indirectly indicates the error rate of tuple extraction and overall ontology formation. An example of contradicting entries are <bird, penguin, fly> vs <bird, penguin, not fly> and <frog, crawl, water> vs <frog, swim, water> (the third argument should be distinct).

Ontology entries are extracted from answers. Then, in the resultant ontology, given each entry, we attempt to find other entries which contradict to the given one. If at least one such entry is found, we consider the given entry inconsistent. The portion of inconsistent entries for the whole ontology is counted and shown as a percentage of all ontology entries. As a baseline, we evaluate an ontology whose entries are extracted from all text parts and left as they are, without any refinement. Then we apply various enhancement stapes and track if they affect the ontology consistency.

TABLE 4

Assessment of ontology consistency

| Dataset/Settings | Baseline extraction of individual entries | Entity grid method | Syntactic + semantic | +Dictionary manager | +Discourse | +Reasoning | +Existing ontology support |
|---|---|---|---|---|---|---|---|
| Medical-Question-Answer-Datasets | 7.6 | 5.9 | 2.8 | 2.4 | 1.7 | 1.1 | 0.8 |
| MedQuAD | 6.2 | 4.7 | 2.3 | 1.9 | 1.4 | 1.2 | 1.1 |
| Medical Q/A data | 7.0 | 5.0 | 2.4 | 1.7 | 1.7 | 1.4 | 1.0 |
| PubMedQA | 6.9 | 6.0 | 3.8 | 2.9 | 1.6 | 1.1 | 0.8 |
| emrQA | 11.1 | 9.8 | 4.9 | 3.2 | 2.2 | 1.6 | 1.3 |

How each ontology improvement is assessed affects the resultant ontology consistency (Table 4). The inconsistency values are normalized for the total number of ontology entries as each refinement step reduce the number of entries, pruning ones determined to do unreliable. Each step has its own machinery of reducing the entries expected to be noisy, unreliable and misleading.

It can be observes that adding rules for extracting ontology entries make the resultant ontology cleaner, more robust and consistent. Employing all means to reduce inconsistencies achieve the contradiction rate of less than 1% of inconsistent ontology entries in most domains. The hardest domains to achieve inconsistency are MedQuAD and emrQA. The worst performance occurs for electronic medical records (the bottom row).

The accuracy of search in a number of health-related datasets when this search is supported by an ontology is evaluated. The complexity of ontological support is varied. (Table 4). As the single best answer for each evaluation dataset is obtained, search relevance is measured as F1.

services that guides the healthcare professional in a correct decision-making process to establish clinical priorities. This complex process was carried out thanks to TM techniques that extract relevant data from electronic medical records, laboratory tests or therapeutic plans (Gupta and Lehal 2009).

Our evaluation showed that relying on discourse analysis indeed improves the quality of an ontology with respect to:
1) Lower number of inconsistencies;
2) Higher relevance of the resultant search.

Once ontology entries are extracted from important and informative parts of text instead of extracting them from all text, the reliability of the resultant ontology for search and decision-making grows.

TABLE 5

Assessment of ontology quality via search relevance

| Dataset/Settings | No ontology baseline, F1 | Ontology is build from all results of syntactic extraction, F1 | Filtering based on CDT, F1 | Aggregation, F1 | Enrichment by dictionary manager, F1 | Validation and foreign ontology matching, F1 |
|---|---|---|---|---|---|---|
| Medical-Question-Answer-Datasets | 78.3 | 80.1 | 82.3 | 84.1 | 85.3 | 86.1 |
| MedQuAD: | 75.1 | 77.0 | 80.4 | 81.6 | 83.0 | 85.0 |
| Medical Q/A data | 80.2 | 81.3 | 83.1 | 85.8 | 86.7 | 86.3 |
| PubMedQA | 77.5 | 78.9 | 82.0 | 84.2 | 86.0 | 87.2 |
| emrQA | 76.0 | 78.1 | 81.2 | 82.9 | 83.9 | 86.4 |
| Improvement | | 2.1 | 5.7 | 8.1 | 9.8 | 11.3 |

One can observe that there is a small improvement in search relevance (F1) with each enhancement in ontology construction. Such an improvement in the range of 2% may be hard to differentiate from a random deviation. However, the overall improvement due to ontologies is significant: above 10%. Our ablation experiments show that each step in discourse processing, aggregation, matching and validation is important and should not be skipped.

Although ontology-assisted search cannot be represented as a machine learning task, in our previous studies we have learned the important lessons from our industrial evaluation of the learning transfer framework (Galitsky 2019). Building ontologies via web mining and applying them in a specific vertical domain can be viewed as inductive transfer/multitask learning with feature representation and a relational-knowledge transfer approach. We evaluated that the ontologies, which are built from a wide variety of sources, including blogs (Galitsky and Kovalerchuk 2006), forums, chats, opinion data (Galitsky and McKenna 2017), and customer support data that are adequate to handle user queries in searching for products and recommendations in vertical domains such as shopping and entertainment at eBay.com as well as in finance. Ontology learning in this work is performed in a vertical domain, where the ambiguity of the terms is limited, and therefore, fully automated settings produce adequate resultant search accuracy.

Figure 29:
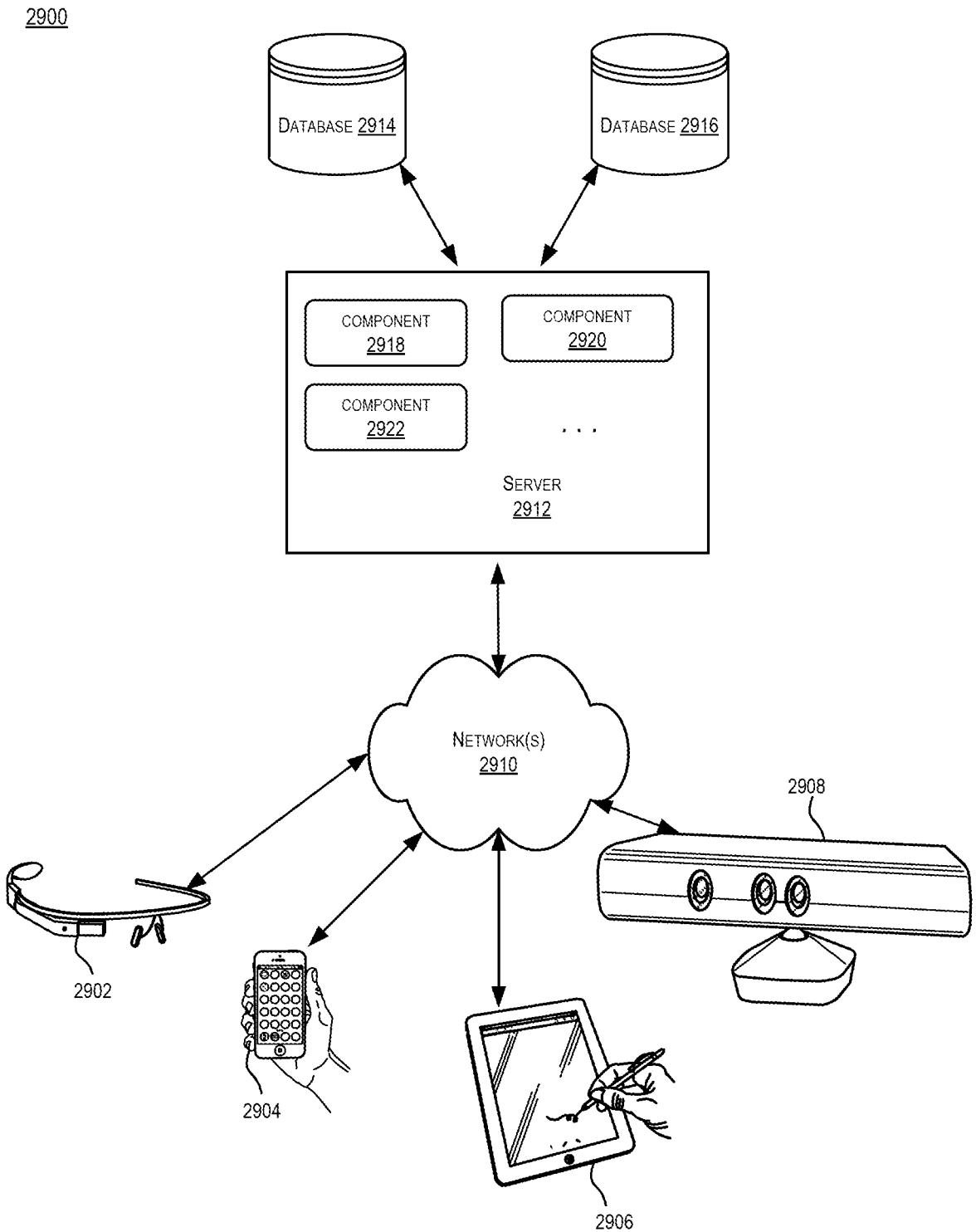
FIG. 29 depicts a simplified diagram of a distributed system for implementing one of the aspects.

Advanced systems for supporting the clinical decision is specially enticing in the emergency department. It is, perhaps, the one that requires the most accurate solution as fast as possible due to the situation is crucial. The use of TM has played an important role in the development of intelligent systems that support decision making in the emergency services, and its application is already an incipient reality. (Portela et al 2014) present a specific system for emergency Exemplary Computing Systems FIG. 29 depicts a simplified diagram of a distributed system 2900 for implementing one of the aspects. In the illustrated aspect, distributed system 2900 includes one or more client computing devices 2902, 2904, 2906, and 2908, which are configured to execute and operate a client application such as a web browser, proprietary client (e.g., Oracle Forms), or the like over one or more network(s) 2910. Server 2912 may be communicatively coupled with client computing devices 2902, 2904, 2906, and 2908 via network 2910.

In various aspects, server 2912 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2902, 2904, 2906, and/or 2908. Users operating client computing devices 2902, 2904, 2906, and/or 2908 may in turn utilize one or more client applications to interact with server 2912 to utilize the services provided by these components.

In the configuration depicted in the figure, the software components 2918, 2920 and 2922 of distributed system 2900 are shown as being implemented on server 2912. In other aspects, one or more of the components of distributed system 2900 and/or the services provided by these components may also be implemented by one or more of the client computing devices 2902, 2904, 2906, and/or 2908. Users operating the client computing devices may then utilize one or more client applications to use the services provided by these components. These components may be implemented in hardware, firmware, software, or combinations thereof. It should be appreciated that various different system configurations are possible, which may be different from distributed system 2900. The aspect shown in the figure is thus one example of a distributed system for implementing an aspect system and is not intended to be limiting.

Client computing devices 2902, 2904, 2906, and/or 2908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2902, 2904, 2906, and 2908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2910.

Although exemplary distributed system 2900 is shown with four client computing devices, any number of client computing devices may be supported. Other devices, such as devices with sensors, etc., may interact with server 2912.

Network(s) 2910 in distributed system 2900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2910 can be a local area network (LAN), such as one based on Ethernet, Token-Ring and/or the like. Network(s) 2910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.29 suite of protocols, Bluetooth®, and/or any other wireless protocol); and/or any combination of these and/or other networks.

Server 2912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2912 can include one or more virtual machines running virtual operating systems, or other computing architectures involving virtualization. One or more flexible pools of logical storage devices can be virtualized to maintain virtual storage devices for the server. Virtual networks can be controlled by server 2912 using software defined networking. In various aspects, server 2912 may be adapted to run one or more services or software applications described in the foregoing disclosure. For example, server 2912 may correspond to a server for performing processing described above according to an aspect of the present disclosure.

Server 2912 may run an operating system including any of those discussed above, as well as any commercially available server operating system. Server 2912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2912 may include one or more applications to analyze and consolidate data feeds and/or event updates received from users of client computing devices 2902, 2904, 2906, and 2908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2912 may also include one or more applications to display the data feeds and/or real-time events via one or more display devices of client computing devices 2902, 2904, 2906, and 2908.

Distributed system 2900 may also include one or more databases 2914 and 2916. Databases 2914 and 2916 may reside in a variety of locations. By way of example, one or more of databases 2914 and 2916 may reside on a non-transitory storage medium local to (and/or resident in) server 2912. Alternatively, databases 2914 and 2916 may be remote from server 2912 and in communication with server 2912 via a network-based or dedicated connection. In one set of aspects, databases 2914 and 2916 may reside in a storage-area network (SAN). Similarly, any necessary files for performing the functions attributed to server 2912 may be stored locally on server 2912 and/or remotely, as appropriate. In one set of aspects, databases 2914 and 2916 may include relational databases, such as databases provided by Oracle, that are adapted to store, update, and retrieve data in response to SQL-formatted commands.

Figure 30:
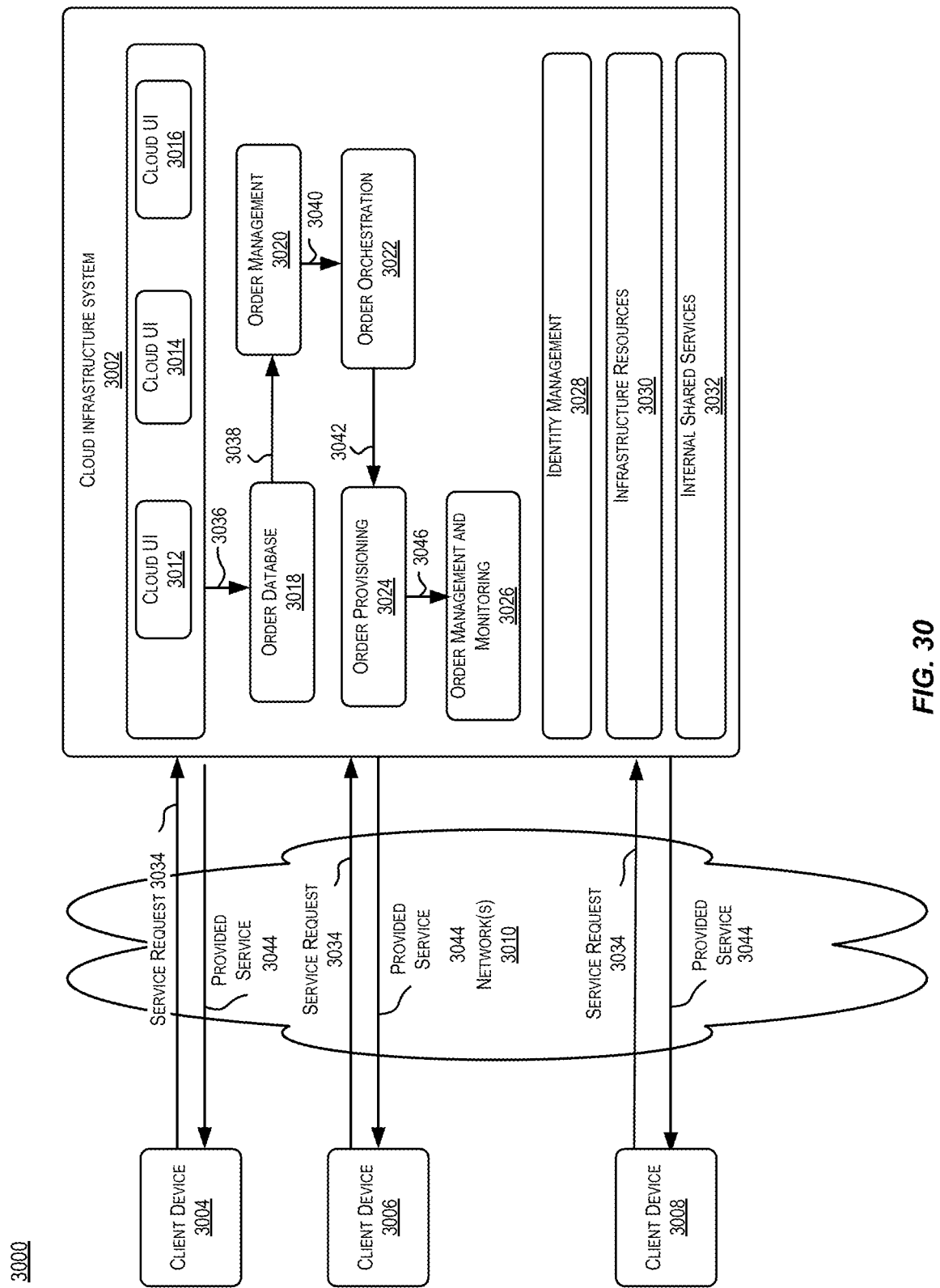
FIG. 30 is a simplified block diagram of components of a system environment by which services provided by the components of an aspect system may be offered as cloud services in accordance with an aspect.

FIG. 30 is a simplified block diagram of one or more components of a system environment 3000 by which services provided by one or more components of an aspect system may be offered as cloud services in accordance with an aspect of the present disclosure. In the illustrated aspect, system environment 3000 includes one or more client computing devices 3004, 3006, and 3008 that may be used by users to interact with a cloud infrastructure system 3002 that provides cloud services. The client computing devices may be configured to operate a client application such as a web browser, a proprietary client application (e.g., Oracle Forms), or some other application, which may be used by a user of the client computing device to interact with cloud infrastructure system 3002 to use services provided by cloud infrastructure system 3002.

It should be appreciated that cloud infrastructure system 3002 depicted in the figure may have other components than those depicted. Further, the aspect shown in the figure is only one example of a cloud infrastructure system that may incorporate an aspect of the invention. In some other aspects, cloud infrastructure system 3002 may have more or fewer components than shown in the figure, may combine two or more components, or may have a different configuration or arrangement of components.

Client computing devices 3004, 3006, and 3008 may be devices similar to those described above for 2902, 2904, 2906, and 2908.

Although exemplary system environment 3000 is shown with three client computing devices, any number of client computing devices may be supported. Other devices such as devices with sensors, etc. may interact with cloud infrastructure system 3002.

Network(s) 3010 may facilitate communications and exchange of data between client computing devices 3004, 3006, and 3008 and cloud infrastructure system 3002. Each network may be any type of network familiar to those skilled in the art that can support data communications using any of a variety of commercially-available protocols, including those described above for network(s) 2910.

Cloud infrastructure system 3002 may comprise one or more computers and/or servers that may include those described above for server 2912.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 3002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 3002 may be adapted to automatically provision, manage and track a customer's subscription to services offered by cloud infrastructure system 3002. Cloud infrastructure system 3002 may provide the cloud services via different deployment models. For example, services may be provided under a public cloud model in which cloud infrastructure system 3002 is owned by an organization selling cloud services (e.g., owned by Oracle) and the services are made available to the general public or different industry enterprises. As another example, services may be provided under a private cloud model in which cloud infrastructure system 3002 is operated solely for a single organization and may provide services for one or more entities within the organization. The cloud services may also be provided under a community cloud model in which cloud infrastructure system 3002 and the services provided by cloud infrastructure system 3002 are shared by several organizations in a related community. The cloud services may also be provided under a hybrid cloud model, which is a combination of two or more different models.

In some aspects, the services provided by cloud infrastructure system 3002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 3002. Cloud infrastructure system 3002 then performs processing to provide the services in the customer's subscription order.

In some aspects, the services provided by cloud infrastructure system 3002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 3002 may also include infrastructure resources 3030 for providing the resources used to provide various services to customers of the cloud infrastructure system. In one aspect, infrastructure resources 3030 may include pre-integrated and optimized combinations of hardware, such as servers, storage, and networking resources to execute the services provided by the PaaS platform and the SaaS platform.

In some aspects, resources in cloud infrastructure system 3002 may be shared by multiple users and dynamically re-allocated per demand. Additionally, resources may be allocated to users in different time zones. For example, cloud infrastructure system 3000 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 3032 may be provided that are shared by different components or modules of cloud infrastructure system 3002 and by the services provided by cloud infrastructure system 3002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 3002 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 3002, and the like.

In one aspect, as depicted in the figure, cloud management functionality may be provided by one or more modules, such as an order management module 3020, an order orchestration module 3022, an order provisioning module 3024, an order management and monitoring module 3026, and an identity management module 3028. These modules may include or be provided using one or more computers and/or servers, which may be general purpose computers, specialized server computers, server farms, server clusters, or any other appropriate arrangement and/or combination.

In exemplary operation 3034, a customer using a client device, such as client computing device 3004, 3006 or 3008, may interact with cloud infrastructure system 3002 by requesting one or more services provided by cloud infrastructure system 3002 and placing an order for a subscription for one or more services offered by cloud infrastructure system 3002. In certain aspects, the customer may access a cloud User Interface (UI), cloud UI 3012, cloud UI 3014 and/or cloud UI 3016 and place a subscription order via these UIs. The order information received by cloud infrastructure system 3002 in response to the customer placing an order may include information identifying the customer and one or more services offered by the cloud infrastructure system 3002 that the customer intends to subscribe to.

After an order has been placed by the customer, the order information is received via the cloud UIs, 3030, 3014 and/or 3016.

At operation 3036, the order is stored in order database 3018. Order database 3018 can be one of several databases operated by cloud infrastructure system 3002 and operated in conjunction with other system elements.

At operation 3038, the order information is forwarded to an order management module 3020. In some instances, order management module 3020 may be configured to perform billing and accounting functions related to the order, such as verifying the order, and upon verification, booking the order.

At operation 3040, information regarding the order is communicated to an order orchestration module 3022. Order orchestration module 3022 may utilize the order information to orchestrate the provisioning of services and resources for the order placed by the customer. In some instances, order orchestration module 3022 may orchestrate the provisioning of resources to support the subscribed services using the services of order provisioning module 3024.

In certain aspects, order orchestration module 3022 enables the management of business processes associated with each order and applies business logic to determine whether an order should proceed to provisioning. At operation 3042, upon receiving an order for a new subscription, order orchestration module 3022 sends a request to order provisioning module 3024 to allocate resources and configure those resources needed to fulfill the subscription order. Order provisioning module 3024 enables the allocation of resources for the services ordered by the customer. Order provisioning module 3024 provides a level of abstraction between the cloud services provided by cloud infrastructure system 3000 and the physical implementation layer that is used to provision the resources for providing the requested services. Order orchestration module 3022 may thus be isolated from implementation details, such as whether or not services and resources are actually provisioned on the fly or pre-provisioned and only allocated/assigned upon request.

At operation 3042, once the services and resources are provisioned, a notification of the provided service 3044 may be sent to customers on client computing devices 3004, 3006 and/or 3008 by order provisioning module 3024 of cloud infrastructure system 3002.

At operation 3046, the customer's subscription order may be managed and tracked by an order management and monitoring module 3026. In some instances, order management and monitoring module 3026 may be configured to collect usage statistics for the services in the subscription order, such as the amount of storage used, the amount data transferred, the number of users, and the amount of system up time and system down time.

In certain aspects, cloud infrastructure system 3000 may include an identity management module 3028. Identity management module 3028 may be configured to provide identity services, such as access management and authorization services in cloud infrastructure system 3000. In some aspects, identity management module 3028 may control information about customers who wish to utilize the services provided by cloud infrastructure system 3002. Such information can include information that authenticates the identities of such customers and information that describes which actions those customers are authorized to perform relative to various system resources (e.g., files, directories, applications, communication ports, memory segments, etc.) Identity management module 3028 may also include the management of descriptive information about each customer and about how and by whom that descriptive information can be accessed and modified.

Figure 31:
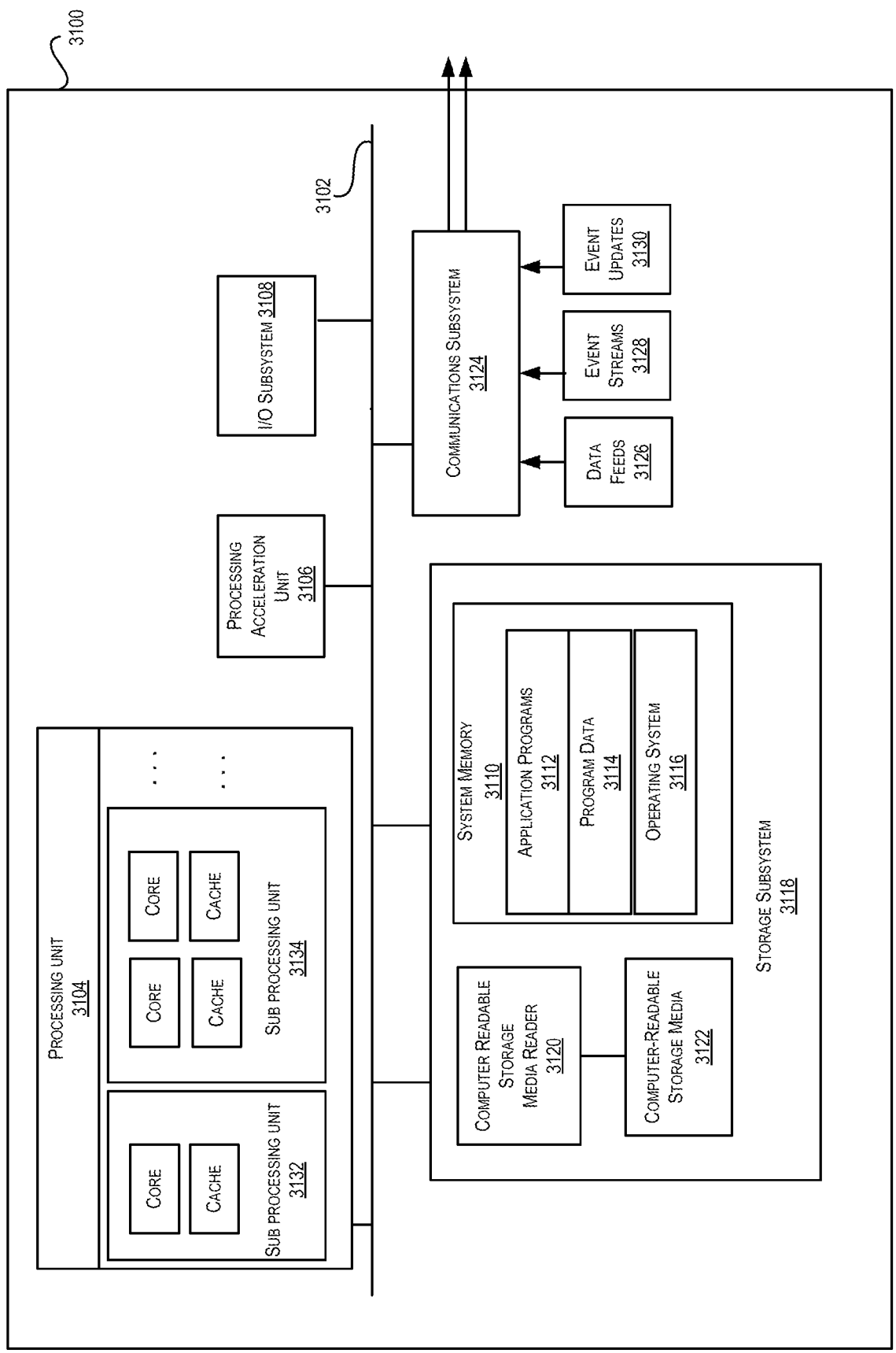
FIG. 31 illustrates an exemplary computer system, in which various aspects of the present invention may be implemented.

FIG. 31 illustrates an exemplary computer system 3100, in which various aspects of the present invention may be implemented. The computer system 3100 may be used to implement any of the computer systems described above. As shown in the figure, computer system 3100 includes a processing unit 3104 that communicates with a number of peripheral subsystems via a bus subsystem 3102. These peripheral subsystems may include a processing acceleration unit 3106, an I/O subsystem 3108, a storage subsystem 3118 and a communications subsystem 3124. Storage subsystem 3118 includes tangible computer-readable storage media 3122 and a system memory 3110.

Bus subsystem 3102 provides a mechanism for letting the various components and subsystems of computer system 3100 communicate with each other as intended. Although bus subsystem 3102 is shown schematically as a single bus, alternative aspects of the bus subsystem may utilize multiple buses. Bus subsystem 3102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P3186.1 standard.

Processing unit 3104, which can be implemented as one or more integrated circuits (e.g., a conventional microprocessor or microcontroller), controls the operation of computer system 3100. One or more processors may be included in processing unit 3104. These processors may include single core or multicore processors. In certain aspects, processing unit 3104 may be implemented as one or more independent processing units 3132 and/or 3134 with single or multicore processors included in each processing unit. In other aspects, processing unit 3104 may also be implemented as a quad-core processing unit formed by integrating two dual-core processors into a single chip.

In various aspects, processing unit 3104 can execute a variety of programs in response to program code and can maintain multiple concurrently executing programs or processes. At any given time, some or all of the program code to be executed can be resident in processing unit 3104 and/or in storage subsystem 3118. Through suitable programming, processing unit 3104 can provide various functionalities described above. Computer system 3100 may additionally include a processing acceleration unit 3106, which can include a digital signal processor (DSP), a special-purpose processor, and/or the like.

I/O subsystem 3108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3100 may comprise a storage subsystem 3118 that comprises software elements, shown as being currently located within a system memory 3110. System memory 3110 may store program instructions that are loadable and executable on processing unit 3104, as well as data generated during the execution of these programs.

Depending on the configuration and type of computer system 3100, system memory 3110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3104. In some implementations, system memory 3110 may include multiple different types of memory, such as static random access memory (SRAM) or dynamic random access memory (DRAM). In some implementations, a basic input/output system (BIOS), containing the basic routines that help to transfer information between elements within computer system 3100, such as during start-up, may typically be stored in the ROM. By way of example, and not limitation, system memory 3110 also illustrates application programs 3112, which may include client applications, Web browsers, mid-tier applications, relational database management systems (RDBMS), etc., program data 3114, and an operating system 3116. By way of example, operating system 3116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 3118 may also provide a tangible computer-readable storage medium for storing the basic programming and data constructs that provide the functionality of some aspects. Software (programs, code modules, instructions) that when executed by a processor provide the functionality described above may be stored in storage subsystem 3118. These software modules or instructions may be executed by processing unit 3104. Storage subsystem 3118 may also provide a repository for storing data used in accordance with the present invention.

Storage subsystem 3118 may also include a computer-readable storage media reader 3120 that can further be connected to computer-readable storage media 3122. Together and, optionally, in combination with system memory 3110, computer-readable storage media 3122 may comprehensively represent remote, local, fixed, and/or removable storage devices plus storage media for temporarily and/or more permanently containing, storing, transmitting, and retrieving computer-readable information.

Computer-readable storage media 3122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computer system 3100.

By way of example, computer-readable storage media 3122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 3122 may include, but is not limited to, Zip® drives, flash memory cards, universal serial bus (USB) flash drives, secure digital (SD) cards, DVD disks, digital video tape, and the like. Computer-readable storage media 3122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3100.

Communications subsystem 3124 provides an interface to other computer systems and networks. Communications subsystem 3124 serves as an interface for receiving data from and transmitting data to other systems from computer system 3100. For example, communications subsystem 3124 may enable computer system 3100 to connect to one or more devices via the Internet. In some aspects, communications subsystem 3124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.30 family standards, or other mobile communication technologies, or any combination thereof), global positioning system (GPS) receiver components, and/or other components. In some aspects, communications subsystem 3124 can provide wired network connectivity (e.g., Ethernet) in addition to or instead of a wireless interface.

In some aspects, communications subsystem 3124 may also receive input communication in the form of structured and/or unstructured data feeds 3126, event streams 3128, event updates 3130, and the like on behalf of one or more users who may use computer system 3100.

By way of example, communications subsystem 3124 may be configured to receive unstructured data feeds 3126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 3124 may also be configured to receive data in the form of continuous data streams, which may include event streams 3128 of real-time events and/or event updates 3130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3124 may also be configured to output the structured and/or unstructured data feeds 3126, event streams 3128, event updates 3130, and the like to one or more databases that may be in communication with one or more streaming data source computers coupled to computer system 3100.

Computer system 3100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of extending an ontology, the method comprising:
    generating, from text comprising fragments, a discourse tree that represents rhetorical relationships between the fragments, wherein the discourse tree comprises a plurality of nodes, each nonterminal node representing a rhetorical relationship between two of the fragments, and each terminal node of the nodes of the discourse tree being associated with one of the fragments;
    identifying, from the discourse tree, a central entity that (i) is associated with a rhetorical relation of type elaboration and (ii) corresponds to a topic node that identifies a corresponding central entity of the text;
    determining, from the discourse tree, a subset of elementary discourse units that are associated with the central entity, wherein determining the subset of elementary discourse units comprises identifying nucleus elementary discourse units that are associated with a relation that is not type elaboration or type joint;
    forming generalized phrases by identifying, in text associated with the subset of elementary discourse units, one or more elements common to two or more elementary discourse units in the subset of elementary discourse units;
    forming tuples from the generalized phrases by applying one or more syntactic or semantic templates to the respective phrase, wherein each tuple of the tuples is an ordered set of words in normal form;
    identifying each tuple of the tuples as having a type comprising: (i) a noun phrase type, (ii) a verb phrase type, (iii) an adjective phrase type, or (iv) a prepositional phrase type; and
    in response to successfully converting an elementary discourse unit associated with an identified tuple into a logical representation comprising a predicate and an argument, updating the ontology with an entity from the identified tuple, wherein the conversion is based on the type of the identified tuple.

2. The method of claim 1, further comprising in response to receiving a query from a user device, locating the entity in the ontology and providing the entity to the user device.

3. The method of claim 2, further comprising identifying an entity class by:
    encoding the identified tuple as a vector representation;
    providing the vector representation to a machine learning model; and
    receiving, from the machine learning model, the entity class,
    wherein providing the entity to the user device comprises providing the entity class to the user device.

4. The method of claim 1, wherein identifying the central entity comprises:
    locating a root node in the discourse tree;
    determining, from the discourse tree, a subset of terminal nodes that are (i) associated with a corresponding nonterminal node representing a rhetorical relationship of type elaboration and (ii) represent a corresponding nucleus elementary discourse unit;
    calculating, for each node of the subset of terminal nodes, a respective path length from the root node; and
    identifying, from the subset of terminal nodes, a particular topic node having a path length that is a smallest path length of the path lengths.

5. The method of claim 1, wherein converting the elementary discourse unit associated with the identified tuple into the respective logical representation comprises:
    identifying that a corresponding type of the identified tuple is the noun phrase type or the prepositional phrase type;
    extracting one or more of a head noun or a last noun as a logical predicate; and
    extracting one or more other words as arguments of the logical predicate.

6. The method of claim 1, wherein converting the elementary discourse unit associated with the identified tuple into the respective logical representation comprises:
    identifying that a corresponding type of the identified tuple is the verb phrase type; and
    extracting a verb of the identified tuple as a logical predicate and one or more other words as arguments of the logical predicate.

7. The method of claim 1, each tuple of the tuples comprises one or more of: a predicate, a subject, and an object.

8. The method of claim 1, further comprising:
identifying an entity class of one or more of the tuples corresponding to the generalized phrases, wherein an entity class represents a category of the entity,
wherein the updating comprises updating the ontology with the entity class.

9. A system comprising:
a non-transitory computer-readable medium storing computer-executable program instructions; and
a processing device communicatively coupled to the non-transitory computer-readable medium for executing the computer-executable program instructions, wherein executing the computer-executable program instructions causes the processing device to perform operations comprising:
generating, from text comprising fragments, a discourse tree that represents rhetorical relationships between the fragments, wherein the discourse tree comprises a plurality of nodes, each nonterminal node representing a rhetorical relationship between two of the fragments, and each terminal node of the nodes of the discourse tree being associated with one of the fragments;
identifying, from the discourse tree, a central entity that (i) is associated with a rhetorical relation of type elaboration and (ii) corresponds to a topic node that identifies a corresponding central entity of the text;
constructing, from the discourse tree, a communicative discourse tree by matching each fragment that has a verb in the discourse tree with a predetermined verb signature;
identifying, from the communicative discourse tree, that the central entity that is associated with the rhetorical relation of type elaboration and corresponds to the topic node that identifies the corresponding central entity of the text;
determining, from the communicative discourse tree, a subset of elementary discourse units that are associated with the central entity, wherein determining the subset of elementary discourse units comprises identifying nucleus elementary discourse units that are associated with a relation that is not of type elaboration or type joint;
forming generalized phrases by identifying, in text associated with the subset of elementary discourse units, one or more elements common to two or more elementary discourse units in the subset of elementary discourse units;
forming tuples from the generalized phrases by applying one or more syntactic or semantic templates to the respective phrase, wherein each tuple is an ordered set of words in normal form;
identifying a tuple of the tuples as having a type comprising: (i) a noun phrase, (ii) a verb phrase, (iii) an adjective phrase, or (iv) a prepositional phrase;
in response to successfully converting an elementary discourse unit associated with an identified tuple into a logical representation comprising a predicate and an argument, updating an ontology with an entity from the identified tuple, wherein the conversion is based on the type of the identified tuple.

10. The system of claim 9, wherein executing the computer-executable program instructions further causes the processing device to perform operations comprising in response to receiving a query from a user device, locating the entity in the ontology and providing the entity to the user device.

11. The system of claim 10, wherein executing the computer-executable program instructions further causes the processing device to perform operations comprising identifying an entity class by:
encoding the identified tuple as a vector representation;
providing the vector representation to a machine learning model; and
receiving, from the machine learning model, the entity class,
wherein providing the entity to the user device comprises providing the entity class to the user device.

12. The system of claim 9, wherein identifying the central entity comprises:
locating a root node in the discourse tree;
determining, from the discourse tree, a subset of terminal nodes that are (i) associated with a corresponding nonterminal node representing a rhetorical relationship of type elaboration and (ii) represent a corresponding nucleus elementary discourse unit;
calculating, for each node of the subset of terminal nodes, a respective path length from the root node; and
identifying, from the subset of terminal nodes, a particular topic node having a path length that is a smallest path length of the path lengths.

13. The system of claim 9, wherein converting the elementary discourse unit associated with the identified tuple into the respective logical representation comprises:
identifying that a corresponding type of the identified tuple is the noun phrase type or the prepositional phrase type;
extracting one or more of a head noun or a last noun as a logical predicate; and
extracting one or more other words as arguments of the logical predicate.

14. The system of claim 9, wherein converting the elementary discourse unit associated with the identified tuple into the respective logical representation comprises:
identifying that a corresponding type of the identified tuple is the verb phrase type; and
extracting a verb of the identified tuple as a logical predicate and one or more other words as arguments of the logical predicate.

15. A non-transitory computer-readable medium storing computer-executable instructions that when executed by a processing device, cause the processing device to perform operations comprising:
generating, from text comprising fragments, a discourse tree that represents rhetorical relationships between the fragments, wherein the discourse tree comprises a plurality of nodes, each nonterminal node representing a rhetorical relationship between two of the fragments, and each terminal node of the nodes of the discourse tree being associated with one of the fragments;
identifying, from the discourse tree, a central entity that (i) is associated with a rhetorical relation of type elaboration and (ii) corresponds to a topic node that identifies a corresponding central entity of the text;
determining, from the discourse tree, a subset of elementary discourse units that are associated with the central entity, wherein determining the subset of elementary discourse units comprises identifying nucleus elementary discourse units that are associated with a relation that is not of type elaboration or type joint;
forming generalized phrases by identifying, in text associated with the subset of elementary discourse units, one or more elements common to two or more elementary discourse units in the subset of elementary discourse units;

forming tuples from the generalized phrases by applying one or more syntactic or semantic templates to the respective phrase, wherein each tuple is an ordered set of words in normal form;

identifying each tuple of tuples as having a type comprising: (i) a noun phrase, (ii) a verb phrase, (iii) an adjective phrase, or (iv) a prepositional phrase; and in response to successfully converting an elementary discourse unit associated with an identified tuple into a logical representation comprising a predicate and an argument, updating an ontology with an entity from the identified tuple, wherein the conversion is based on the type of the identified tuple.

16. The non-transitory computer-readable medium of claim 15, wherein executing the computer-executable instructions further causes the processing device to perform operations comprising identifying an entity class by comprising in response to receiving a query from a user device, locating the entity in the ontology and providing the entity to the user device.

17. The non-transitory computer-readable medium of claim 16, wherein executing the computer-executable instructions further causes the processing device to identify the entity class by:

encoding the identified tuple as a vector representation;

providing the vector representation to a machine learning model; and receiving, from the machine learning model, the entity class, wherein providing the entity to the user device comprises providing the entity class to the user device.

18. The non-transitory computer-readable medium of claim 15, wherein identifying the central entity comprises:

locating a root node in the discourse tree;

determining, from the discourse tree, a subset of terminal nodes that are (i) associated with a corresponding nonterminal node representing a rhetorical relationship of type elaboration and (ii) represent a corresponding nucleus elementary discourse unit;

calculating, for each node of the subset of terminal nodes, a respective path length from the root node; and identifying, from the subset of terminal nodes, a particular topic node having a path length that is a smallest path length of the path lengths.

19. The non-transitory computer-readable medium of claim 15, wherein converting the elementary discourse unit associated with the identified tuple into the respective logical representation comprises:

identifying that a type of the identified tuple is the noun phrase type or the prepositional phrase type;

extracting one or more of a head noun or a last noun as a logical predicate; and extracting one or more other words as arguments.

20. The non-transitory computer-readable medium of claim 15, wherein executing the computer-executable instructions further causes the processing device to perform operations comprising:

identifying an entity class of one or more of the tuples corresponding to the generalized phrases, wherein an entity class represents a category of the entity, wherein the updating comprises updating the ontology with the entity class.

* * * * *

UNITED STATES PATENT AND TRADEMARK OFFICE
CERTIFICATE OF CORRECTION

PATENT NO. : 11,914,961 B2  
APPLICATION NO. : 17/466409  
DATED : February 27, 2024  
INVENTOR(S) : Galitsky Page 1 of 1

It is certified that error appears in the above-identified patent and that said Letters Patent is hereby corrected as shown below:

In the Specification

In Column 4, Line 17, delete "24A 24B," and insert -- 24A-24B, --, therefor.

In Column 18, Line 2, delete "Colorado" and insert -- Colorado. --, therefor.

In Column 20, Line 57, delete "a an" and insert -- an --, therefor.

In Column 21, Line 1, delete "The" and insert -- the --, therefor.

In Column 24, Line 36, delete "can to" and insert -- can --, therefor.

In Column 27, Line 40, delete "(Right-to-left)" and insert -- (RightToLeft) --, therefor.

In Column 27, Line 56, delete "amount" and insert -- amount. --, therefor.

In Column 30, Line 29, delete "cleaned/normalized;" and insert -- cleaned/normalized. --, therefor.

In Column 31, Line 2, delete "low" and insert -- low. --, therefor.

In Column 34, Line 23, delete "the an" and insert -- an --, therefor.

In the Claims

In Column 52, Line 2, in Claim 1, after "not" insert -- of --, therefor.

Signed and Sealed this  
Ninth Day of July, 2024

*Katherine Kelly Vidal*  
Katherine Kelly Vidal  
*Director of the United States Patent and Trademark Office*